(12) United States Patent
Rosenhouse

(10) Patent No.: US 9,025,687 B2
(45) Date of Patent: May 5, 2015

(54) ADAPTIVE SLICER AND CONSTELLATIONS FOR QAM COMMUNICATIONS

(71) Applicant: Ceragon Networks Ltd., Tel-Aviv (IL)

(72) Inventor: Isaac Rosenhouse, Kiryat-Ono (IL)

(73) Assignee: Ceragon Networks Ltd., Tel-Aviv (IL)

( * ) Notice: Subject to any disclaimer, the term of this patent is extended or adjusted under 35 U.S.C. 154(b) by 0 days.

(21) Appl. No.: 13/932,080

(22) Filed: Jul. 1, 2013

(65) Prior Publication Data
US 2014/0003546 A1    Jan. 2, 2014

Related U.S. Application Data

(60) Provisional application No. 61/666,884, filed on Jul. 1, 2012.

(51) Int. Cl.
*H04L 5/12* (2006.01)
*H04L 27/38* (2006.01)
*H04L 1/00* (2006.01)

(52) U.S. Cl.
CPC ............ *H04L 27/38* (2013.01); *H04L 1/0054* (2013.01)

(58) Field of Classification Search
USPC ......... 375/261–262, 285, 298, 340–341, 278; 714/780, 786, 794
See application file for complete search history.

(56) References Cited

U.S. PATENT DOCUMENTS 6,167,095 A * 12/2000 Furukawa et al. ............ 375/285
6,252,912 B1 * 6/2001 Salinger ........................ 375/278
7,286,614 B2 * 10/2007 Goldstein et al. ............. 375/316
8,301,989 B1 * 10/2012 Griniasty ........................ 714/786
8,645,808 B1 * 2/2014 Griniasty ........................ 714/786

OTHER PUBLICATIONS

Forney et al. "Efficient Modulation for Band-Limited Channels", IEEE Journal on Selected Areas in Communications, SAC-2, (5): 632-647, Sep. 1984.
Kurakake et al. "1024-QAM Demodulator robust to Phase Noise of Cable STB Tuners", IEEE Transactions on Consumer 418 Electronics, 51,(2): 413-418, May 2005.
Betts et al. "Performance of Nonuniform Constellations on the Gaussian Channel", IEEE Transactions on Information Theory, 40,(5): 1633-1638, Sep. 1994.
Gjertsen "High Order Modulation shaped to Work with Radio Imperfections", ARMMS RF & Microwave Society Conference, 2005.

* cited by examiner

*Primary Examiner* — Khanh C Tran

(57) ABSTRACT

A method for a QAM receiver to decide a value of a received symbol of an N-point QAM constellation transmission including extracting coordinate values for the received symbol, and using a decision method for deciding the value of the received symbol based on the extracted coordinate values, in which the decision method for the N-point QAM constellation is updated based on a clustering of received symbols. A method for a QAM transmitter to modify an N-point QAM constellation including starting with an initial N-point QAM constellation, measuring a clustering of coordinates of the N-point QAM constellation, shifting coordinates of at least one symbol of the N-point QAM constellation, and producing a modified constellation with shifted coordinates, wherein the shifting is based on data describing a clustering of at least some symbols of the N-point QAM constellation. Related apparatus and methods are also described.

35 Claims, 20 Drawing Sheets

ADAPTIVE SLICER AND CONSTELLATIONS FOR QAM COMMUNICATIONS

RELATED APPLICATION

This application claims the benefit of priority under 35 USC 119(e) of U.S. Provisional Patent Application No. 61/666,884 filed Jul. 1, 2012, the contents of which are incorporated herein by reference in their entirety.

FIELD AND BACKGROUND OF THE INVENTION

The present invention, in some embodiments thereof, relates to a method of receiving and transmitting Quadrature Amplitude Modulated (QAM) transmissions.

In many communication applications a receiver makes a decision about a transmitted symbol based on a corresponding received symbol. A component responsible for making such decisions is termed here "slicer" since it slices the symbol space into regions. Each region of symbol space corresponds to a different constellation symbol. In linear modulations such as Pulse Amplitude Modulation (PAM), QAM and Phase Shift keying (PSK) decisions are usually based on a predefined grid.

Reference is now made to FIG. 1, which is a simplified graph 100 demonstrating a standard slicer grid 104 for a 64 QAM constellation with symbols 103 embedded in Additive White Gaussian Noise (AWGN).

A slicer based on the standard slicer grid 104 is termed herein a standard slicer.

The graph 100 of FIG. 1 has a I axis 101 and an Q axis 102, and depicts the symbols 103 received by a receiver, where the symbols 103 are embedded in AWGN, and therefore are not sharply-defined points at centers of grid 104 cells, but are rather spread out within the grid 104 cells. The grid 104 cell lines designate standard slicing region boundaries.

Additional Background Art Includes:

An article titled "1024-QAM Demodulator Robust to Phase Noise of Cable STB Tuners" by Takuya Kurakake, Naoyoshi Nakamura, and Kimiyuki Oyamada, published in IEEE Transactions on Consumer 418 Electronics, Vol. 51, No. 2, May 2005, pages 413-418.

An article titled "Efficient Modulation for Band-Limited Channels" by G. David Forney, Jr., Robert G. Gallager, Gordon R. Lang, Fred M. Longstaff and Shahid U. Qureshi, published in IEEE Journal On Selected Areas In Communications, Vol. Sac-2, No. 5, September 1984, Pages 632-647.

An article titled "High Order Modulation Shaped To Work With Radio Imperfections" by Karl Martin Gjertsen, of Nera Networks AS, P.O. Box 7090, N-5020 Bergen, Norway, published in ARMMS RF & Microwave Society conference, 2005.

An article titled "Performance of Nonuniform Constellations on the Gaussian Channel" by W. Betts, A. R. Calderbank, and Rajiv Laroia, published in IEEE Transactions On Information Theory, Vol. 40, No. 5, September 1994, pages 1633-1638.

An article titled "Performance Optimization of High Order QAM in Presence of Phase Noise and AWGN: Application to a Decision Directed Frequency Synchronization System" by Stephane Bougeard, Jean-Francois Helard and Isabelle Siaud, published in Wireless Personal Communications (2006) 37: 123-138, Springer 2006.

The disclosures of all references mentioned above and throughout the present specification, as well as the disclosures of all references mentioned in those references, are hereby incorporated herein by reference.

SUMMARY OF THE INVENTION

The present invention, in some embodiments thereof, relates to a method of receiving and transmitting Quadrature Amplitude Modulated (QAM) transmissions.

Various causes, such as noise or distortion or interference in a transmission path and/or in a transmitter and/or in a receiver, and other causes, may deform the way in which received symbols disperse around their expected received coordinates.

Some embodiments of the invention redefine the regions in a QAM slicer at a receiver to make better decisions about transmitted symbols.

The better decisions potentially provide a better signal to noise ratio.

In some embodiments, coordinates of constellation points at the transmitter are modified, and the symbol error rate or bit error rate is improved at a receiver using a standard slicer.

In some embodiments, coordinates of the constellation points at the transmitter are modified, and the QAM slicing regions are redefined at the receiver, to make better decisions about transmitted symbols.

In some embodiments, coordinates of the constellation points at the transmitter are modified, and the transmitter sends data describing the modified constellation to the receiver, which optionally uses the data to redefine slicing regions by the adaptive slicer at the receiver.

In some embodiments, the QAM slicing regions are modified at the receiver, and the receiver sends data describing the modified slicing regions to the transmitter, which optionally uses the data to modify coordinates of the constellation points.

According to an aspect of some embodiments of the present invention there is provided a method for a QAM receiver to decide a value of a received symbol of an N-point QAM constellation transmission including extracting coordinate values for the received symbol, and using a decision method for deciding the value of the received symbol based on the extracted coordinate values, in which the decision method for the N-point QAM constellation is updated based, at least in part, on a clustering of received symbols.

According to some embodiments of the invention, the decision method is based on a likelihood value calculated for a received symbol to belong to a specific cluster.

According to some embodiments of the invention, the decision method is calculated based on a Log-Likelihood-Ratio (LLR) value calculated for a received symbol to belong to a specific cluster.

According to some embodiments of the invention, further including using the Log-Likelihood-Ratio (LLR) value calculated for a received symbol to belong to a specific cluster to also calculate bit LLR values.

According to some embodiments of the invention, the decision method is based, at least in part, on a known distribution of noise. According to some embodiments of the invention, the decision method is calculated adaptively in real time. According to some embodiments of the invention, the decision method is calculated based on noise parameters estimated by the receiver.

According to some embodiments of the invention, the coordinates are Cartesian I and Q coordinates.

According to some embodiments of the invention, the receiver updates parameters describing a Gaussian distribution of a received symbol as follows:

$$\underline{\mu}_i = (1-\alpha) \cdot \underline{\mu}_i + \alpha \cdot \underline{x}$$

$$C_i = (1-\alpha) \cdot C_i + \alpha \cdot \begin{pmatrix} (I - \mu_{I,i})^2 & (I - \mu_{I,i})(Q - \mu_{Q,i}) \\ (I - \mu_{I,i})(Q - \mu_{Q,i}) & (Q - \mu_{Q,i})^2 \end{pmatrix}$$

where $\underline{x}$ is a vector representing I and Q coordinates of the received symbol, $\mu_i$ is a vector representing a mean of a cluster i, $\alpha$ is a parameter for determining a rate of updating, $C_i$ is a covariance matrix of the cluster, and I and Q are values of the I and Q coordinates of the received symbol.

According to some embodiments of the invention, the coordinates are polar coordinates.

According to some embodiments of the invention, the decision method is calculated based on constellation coordinates provided from a transmitter. According to some embodiments of the invention, the decision method is calculated based on constellation coordinate shifts provided from a transmitter.

According to some embodiments of the invention, the decision method includes a selected one of a plurality of preset decision methods.

According to some embodiments of the invention, the decision method is implemented using an array, coordinates of a received symbol are converted to an address in the array, and contents of the array at the address providing the value of the received symbol. According to some embodiments of the invention, further including contents of the array at the address providing a bit LLR value of the received symbol. According to some embodiments of the invention, the number of cells in the array is larger than the number of symbols in the N-point QAM constellation.

According to some embodiments of the invention, further including the receiver sending a transmitter information about the decision method. According to some embodiments of the invention, the information includes information about a noise distribution in received symbols. According to some embodiments of the invention, the information includes a mean value of a distribution of samples of at least one of the received symbols. According to some embodiments of the invention, the information includes a covariance matrix of a distribution of samples of at least one of the received symbols. According to some embodiments of the invention, the information is an indication of which preset decision method selected from a plurality of preset decision methods the receiver is using.

According to an aspect of some embodiments of the present invention there is provided a dynamically adaptive slicer for a QAM receiver to decide a value of a received input of an N-point QAM constellation transmission including a unit for a constellation subset selection, configured for receiving an input sample and producing a subset of symbols of the N-point QAM constellation, a unit for calculating a likelihood that the received input sample belongs to each one of the subset based on cluster parameters read from a cluster parameter unit and producing likelihood values for each one of the subset, and a maximum likelihood selection unit for selecting a symbol having a maximal likelihood value from the likelihood values of each one of the subset.

According to some embodiments of the invention, further including a cluster parameter update unit for receiving the selected symbol, reading cluster parameters from the cluster parameter unit, producing updated cluster parameters, and writing the updated cluster parameters to the cluster parameter unit.

According to some embodiments of the invention, the unit for calculating a likelihood is configured for calculating a log-likelihood.

According to an aspect of some embodiments of the present invention there is provided a method for a QAM transmitter to modify an N-point QAM constellation including starting with an initial N-point QAM constellation, measuring a clustering of coordinates of the N-point QAM constellation, shifting coordinates of at least one symbol of the N-point QAM constellation, and producing a modified constellation with shifted coordinates, wherein the shifting is based, at least in part, on data describing a clustering of at least some symbols of the N-point QAM constellation.

According to some embodiments of the invention, the data describing a clustering of at least some symbols of the N-point QAM constellation is received, at least in part, from a receiver sending data describing a clustering of at least some received symbols. According to some embodiments of the invention, the data describing a clustering of at least some received symbols from the receiver includes a mean value of a distribution of the at least some received symbols. According to some embodiments of the invention, the data describing a clustering of at least some received symbols from the receiver includes a covariance matrix of a distribution of the at least some received symbols.

According to some embodiments of the invention, the shifting is based, at least in part, on measuring noise and identifying a known distribution of noise. According to some embodiments of the invention, the shifting is calculated adaptively in real time.

According to some embodiments of the invention, the coordinate values include polar coordinate values.

According to some embodiments of the invention, the initial N-point QAM constellation includes coordinate values arranged in square cells. According to some embodiments of the invention, the initial N-point QAM constellation includes coordinate values arranged in hexagonal cells. According to some embodiments of the invention, the initial N-point QAM constellation includes coordinate values arranged in circles.

According to some embodiments of the invention, the shifting includes selecting one preset shifted N-point QAM constellation selected from a plurality of preset shifted N-point QAM constellations.

According to some embodiments of the invention, the above claims and further including the transmitter sending a receiver information about the modified constellation.

According to some embodiments of the invention, the information includes coordinates for at least one shifted symbol in the modified constellation. According to some embodiments of the invention, the information includes a coordinate shift for at least one modified symbol in the modified constellation.

According to some embodiments of the invention, the information is an indication of which preset shifted N-point QAM constellation selected from a plurality of shifted N-point QAM constellations the transmitter is using.

According to an aspect of some embodiments of the present invention there is provided a dynamically adaptive constellation mapper for producing coordinate values of a symbol of an N-point QAM constellation including an adaptive symbol mapper for receiving an input symbol and producing symbol coordinates for QAM transmission based on a constellation symbol mapping, a shift calculator for reading symbol cluster information, reading the constellation symbol mapping, calculating a shift for coordinates of at least one symbol of the constellation symbol mapping, and updating the constellation symbol mapping in the adaptive symbol mapper.

According to some embodiments of the invention, further including a unit for receiving the symbol cluster information from a QAM receiver.

According to some embodiments of the invention, the symbol mapper includes an array including symbol coordinates for each one of the constellation symbols.

According to an aspect of some embodiments of the present invention there is provided a QAM communication system including a QAM receiver including an dynamically adaptive slicer and a QAM transmitter. According to some embodiments of the invention, the QAM transmitter includes a dynamically adaptive constellation mapper.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a method of receiving and transmitting Quadrature Amplitude Modulated (QAM) transmissions.

Figure 1:
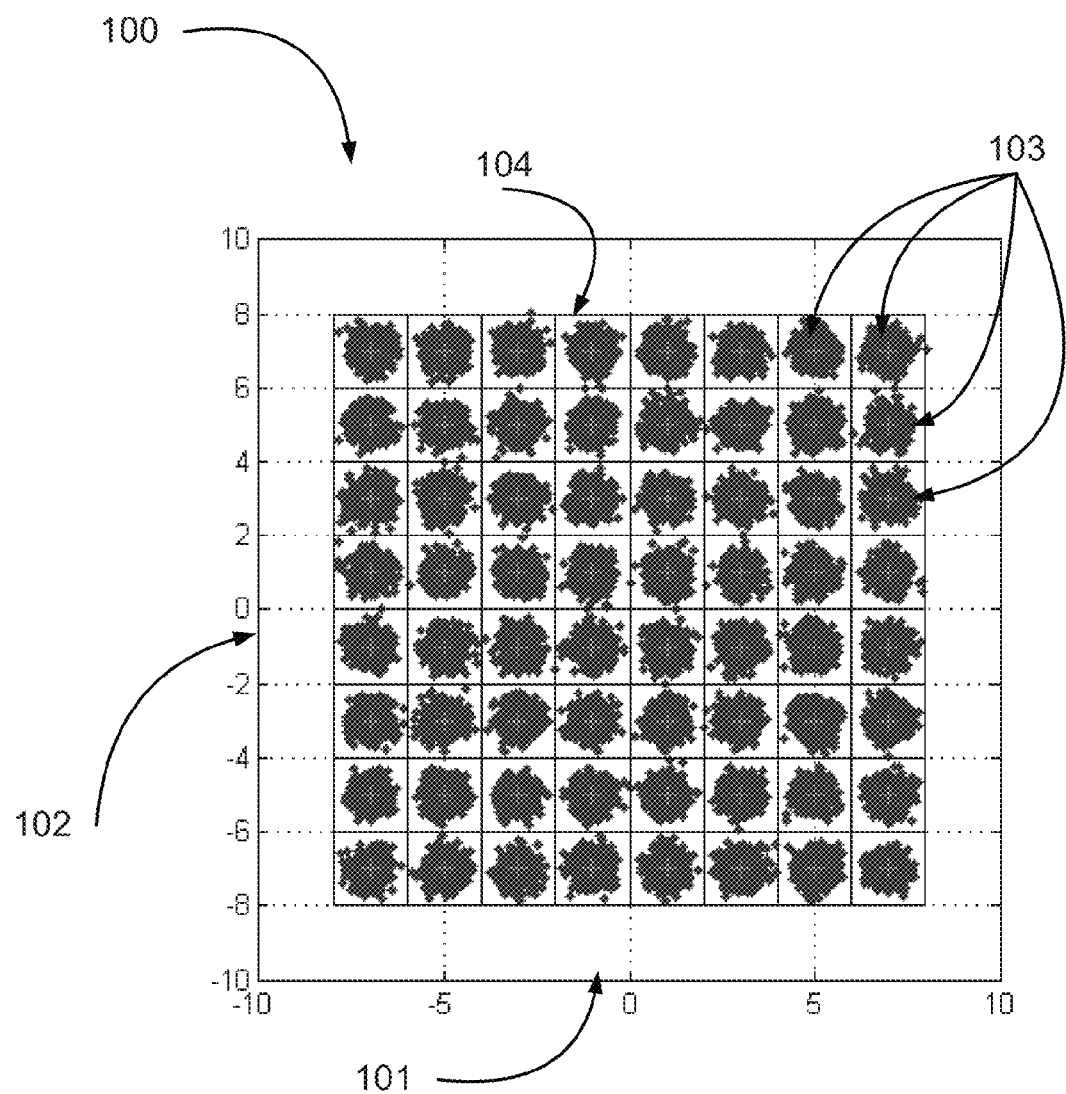
FIG. 1 is a simplified graph demonstrating a standard slicer grid for a 64 QAM constellation with symbols embedded in Additive White Gaussian Noise (AWGN)
Figure 2A:
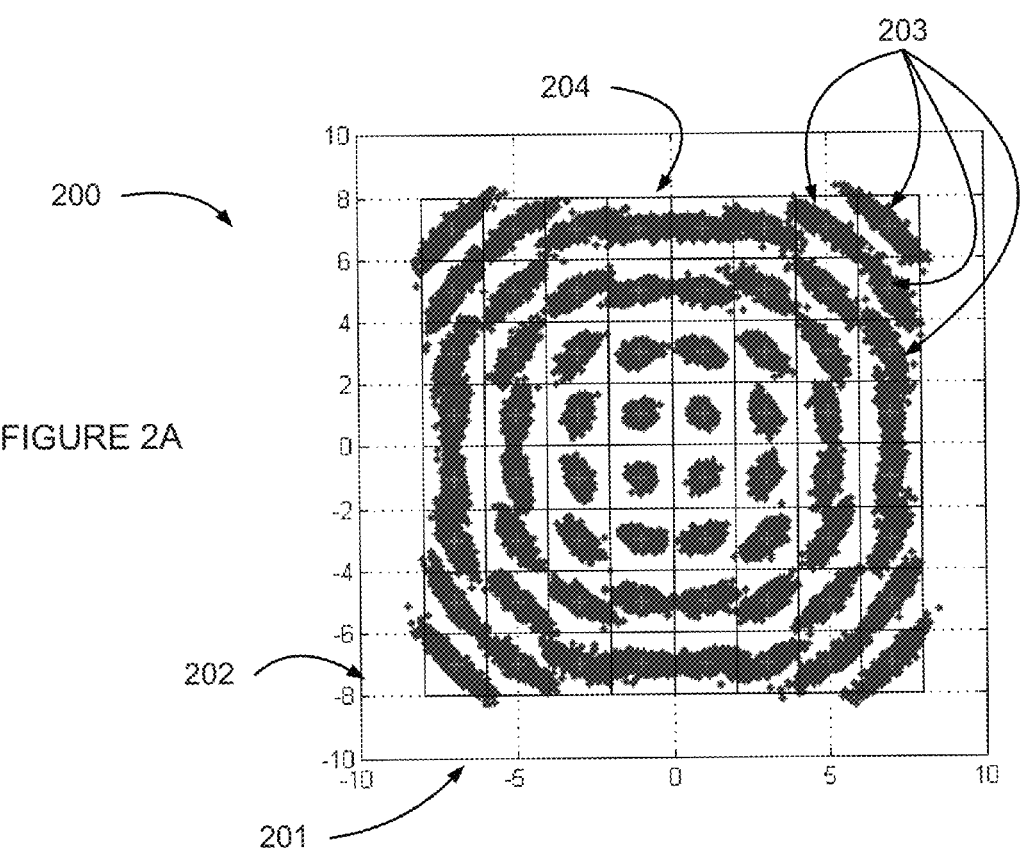
FIG. 2A is a simplified graph demonstrating a standard grid for a 64 QAM constellation with symbols embedded in Additive White Gaussian Noise (AWGN) with a multiplicative phase noise also present.

Reference is now made to FIG. 2A, which is a simplified graph 200 demonstrating a standard grid 204 for a 64 QAM constellation with symbols 203 embedded in Additive White Gaussian Noise (AWGN) with a multiplicative phase noise also present.

The phase noise rotates the symbols 203 randomly, causing the standard slicer to become suboptimal.

The graph 200 of FIG. 2A has an I axis 201 and a Q axis 202, and depicts symbols 203 received by a receiver, where the samples are embedded in AWGN multiplied by a random phase noise, and therefore are not sharply-defined points at centers of grid 204 cells, but are rather spread out within the grid 204 cells, and also spread out in a circular direction about the center of the grid 204. The grid 204 cell lines designate standard slicing region boundaries.

Figure 2B:
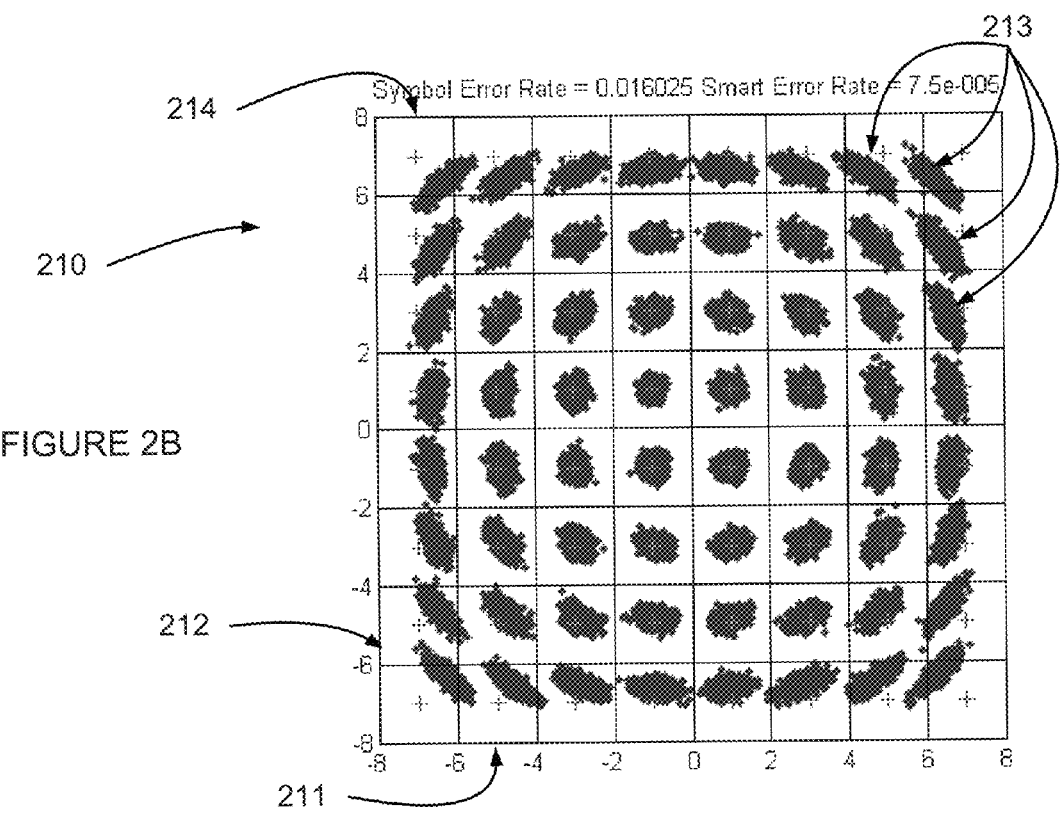
FIG. 2B is a simplified graph demonstrating a standard slicer grid for a 64 QAM constellation with symbols embedded in Additive White Gaussian Noise (AWGN) and multiplicative phase noise and a nonlinear distortion which compresses the outer symbols.

Reference is now made to FIG. 2B, which is a simplified graph 210 demonstrating a standard slicer grid 214 for a 64 QAM constellation with symbols 213 embedded in Additive White Gaussian Noise (AWGN) and multiplicative phase noise and a nonlinear distortion which compresses the outer symbols.

The standard slicer grid 214 cell lines designate standard slicing region boundaries.

The nonlinear distortion which compresses the outer symbols causes the standard slicer to become even more suboptimal.

Additional distortions which may cause a standard slicer to become suboptimal include, by way of some non-limiting examples: offset, stretching of the constellation, phase rotation of one of the axes, and gain noise.

FIG. 2B illustrates that even though a standard slicer occasionally makes errors, a human eye, for example, can isolate 64 regions, each corresponding to a different symbol. These regions are not square anymore. In some embodiments the slicer, at the receiver, learns a distribution of each cluster of points and adapts the slicing regions to these distributions.

In some embodiments, the slicer learns the distribution over time, and adapts to a changing of the received distribution.

In some embodiments, by modifying the coordinates of the constellation points at the transmitter, noise immunity is improved. In some embodiments the transmitter modifies coordinates while transmitting to a receiver having a standard slicer.

Figure 3:
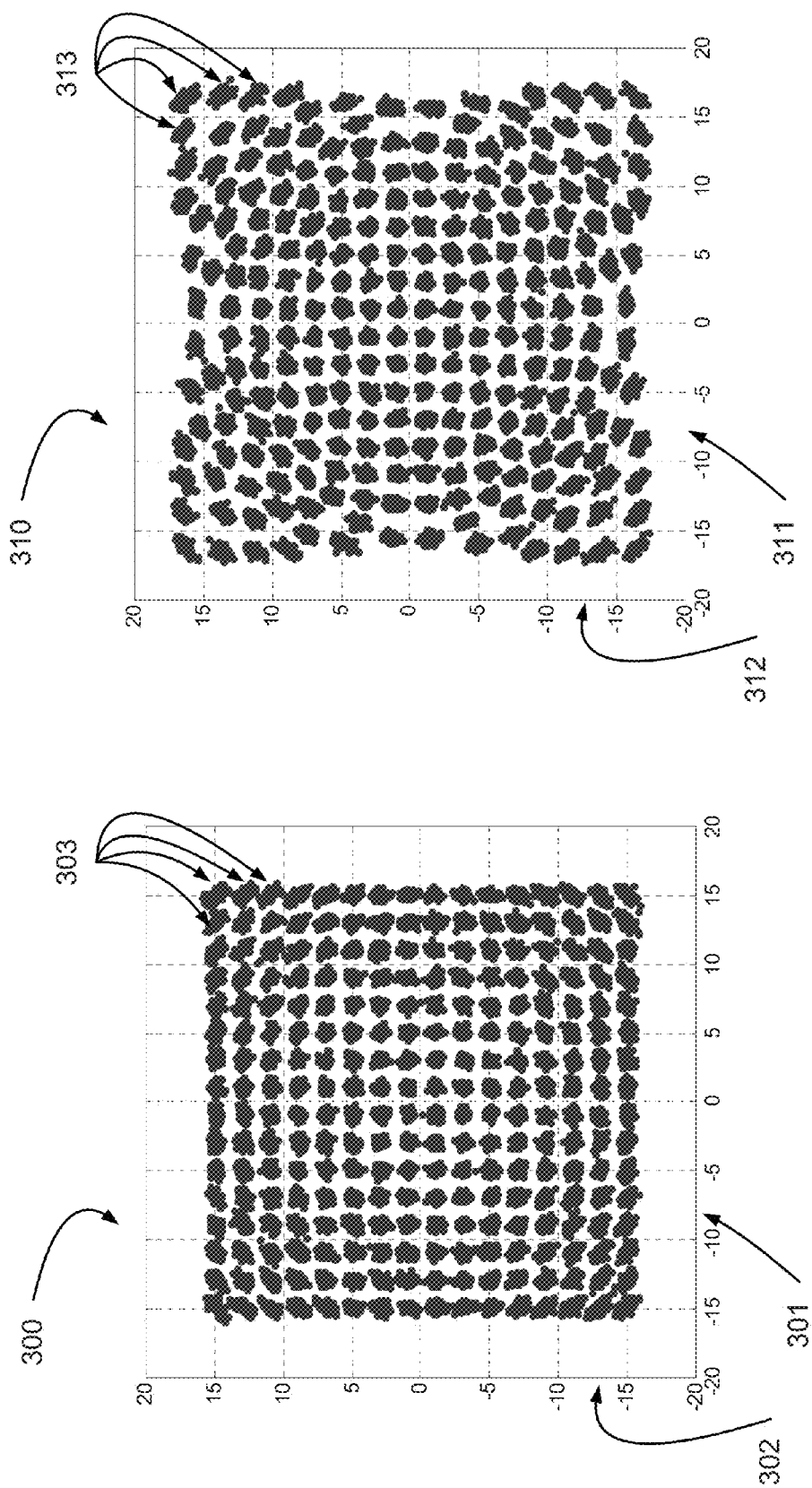
FIG. 3 is a simplified illustration of a first graph depicting reception of a standard 256 QAM constellation, and a second graph depicting reception of a modified 256 QAM constellation, according to an example embodiment of the invention.

Reference is now made to FIG. 3, which is a simplified illustration of a first graph 300 depicting reception of a standard 256 QAM constellation 303, and a second graph 310 depicting reception of a modified 256 QAM constellation 313, according to an example embodiment of the invention.

The first graph 300 of FIG. 3 has an I axis 301 and a Q axis 302, and depicts symbols 303 received by a receiver, where the samples are embedded in AWGN, and therefore are rather spread out, and some sample clusters even touch each other.

It is noted that in FIG. 2B a human can see 64 distinct sample clusters, even though some clusters extend beyond boundaries of the standard slicer grid 214. In the first graph 300 of FIG. 3 the sample clusters are not distinct any more.

The second graph 310 of FIG. 3 has an I axis 311 and a Q axis 312, and depicts symbols 313 received by a receiver, where the samples are also embedded in AWGN, and therefore are rather spread out. However, the second graph 310 depicts reception of a modified 256 QAM constellation 313, in which a transmitter modified the coordinates of the transmitted symbols, spacing them further apart, at least in some locations in the constellation.

In the second graph 310 of FIG. 3 the sample clusters are once again distinct, at least to a human eye.

In some embodiments, the receiver has dynamically adaptive slicer, which modifies its slicing regions for the modified constellation for an N-point QAM constellation based, at least in part, on a clustering of received symbols.

In some embodiments, the dynamically adaptive slicer modifies its slicing regions independently, based on received symbols, without requiring an external command to modify the slicing regions.

In some embodiments, the dynamically adaptive slicer modifies its slicing regions based on information received from a transmitter.

It is noted that a task related to decision making is providing a reliability of each of the bits which are associated with the constellation symbols. The task is closely related to the slicing operation and can optionally be done simultaneously with the slicing operation.

In some embodiments, the adaptive slicer is optionally implemented as a real-time machine which actively tracks changes in noise distribution and constellation point locations, and optionally dynamically adapts its decision method for the constellation based on the noise distribution and constellation point locations.

In some embodiments, information about the noise distribution is optionally passed to the transmitter, which in some embodiments, optionally uses the information for optimizing the constellation.

In some embodiments implementation is optionally based on real-time calculations of the slicer and constellation.

In some embodiments, implementation is optionally based on using one or more pre-calculated sets of constellations and/or slicers.

In some embodiments, implementation is optionally based on using one or more pre-calculated sets of constellations paired to corresponding slicers.

It is noted that embodiments of the invention are described herein with reference to a communication system which changes a constellation pattern but maintains the number of constellation points.

A Mathematical Explanation about Gaussian Mixtures

A distribution of points in a cluster of symbols received at a receiver may optionally be represented as a sum of two-dimensional Gaussian distributions. A two dimensional Gaussian distribution has the following mathematical form:

$$f_x(x \mid \underline{\mu}, C) = \frac{1}{2\pi|C|} \cdot \exp\left\{-\frac{1}{2}(x-\underline{\mu})^T \cdot C^{-1} \cdot (x-\underline{\mu})\right\} \quad \text{Equation 1}$$

The vector $\underline{x}$ represents coordinates in a two-dimensional space with axes of the two-dimensional space denoted by I and Q.

$$\underline{x} = \begin{pmatrix} I \\ Q \end{pmatrix} \quad \text{Equation 2}$$

A vector $\underline{\mu}$ represents mean values of the Gaussian distribution on each axis, and a matrix C represents a covariance matrix of the Gaussian distribution.

$$\underline{\mu} = \begin{pmatrix} E\{I\} \\ E\{Q\} \end{pmatrix} = \begin{pmatrix} \mu_I \\ \mu_Q \end{pmatrix} \quad \text{Equation 3}$$

$$C = \begin{pmatrix} E\{(I-\mu_I)^2\} & E\{(I-\mu_I)(Q-\mu_Q)\} \\ E\{(I-\mu_I)(Q-\mu_Q)\} & E\{(Q-\mu_Q)^2\} \end{pmatrix}$$

The operator $E\{\ \}$ denotes a statistical mean, or expectation.

Figure 4:
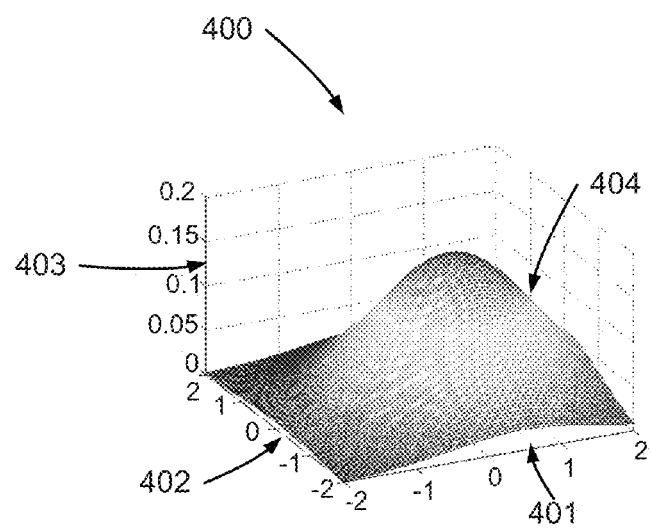
FIG. 4 is a three dimensional graph of a two-dimensional (2D) Gaussian distribution whose covariance matrix is a unity matrix.

Reference is now made to FIG. 4, which is a three dimensional graph 400 of a two-dimensional (2D) Gaussian distribution 404 whose covariance matrix is a unity matrix.

FIG. 4 depicts the three dimensional graph 400 having a Q axis 401, an I axis 402 and a z-axis 403 representing relative probability of occurrences of specific Q and I values. The mean of FIG. 4 is at [0.6, 0], and the covariance matrix is a unity matrix.

Figure 5:
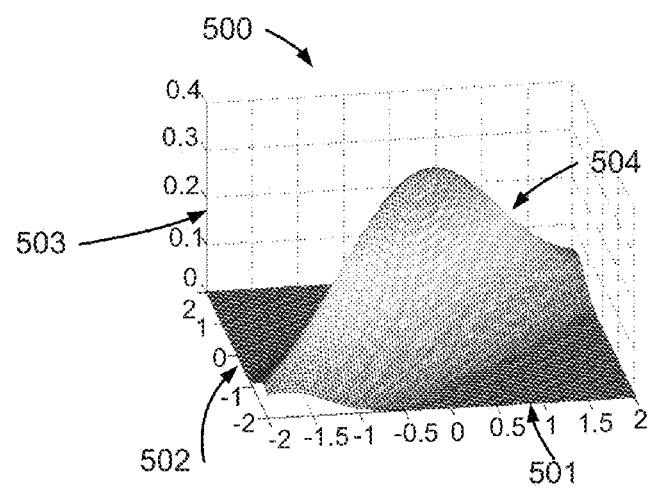
FIG. 5 is a three dimensional graph of a two-dimensional (2D) Gaussian distribution having a covariance matrix other than the unity matrix.

Reference is now made to FIG. 5, which is a three dimensional graph 500 of a two-dimensional (2D) Gaussian distribution 504 having a covariance matrix other than the unity matrix.

FIG. 5 depicts the three dimensional graph 500 having a Q axis 501, an I axis 502 and a z-axis 503 representing relative probability of occurrences of specific Q and I values. The mean of FIG. 4 is at [0, 0], and the covariance matrix of FIG. 5 is $$C = \begin{pmatrix} 1 & 0.9 \\ 0.9 & 1 \end{pmatrix}.$$

FIG. 5 depicts a distribution which is concentrated in a specific direction. The distribution is not circular as in FIG. 4.

Figure 6:
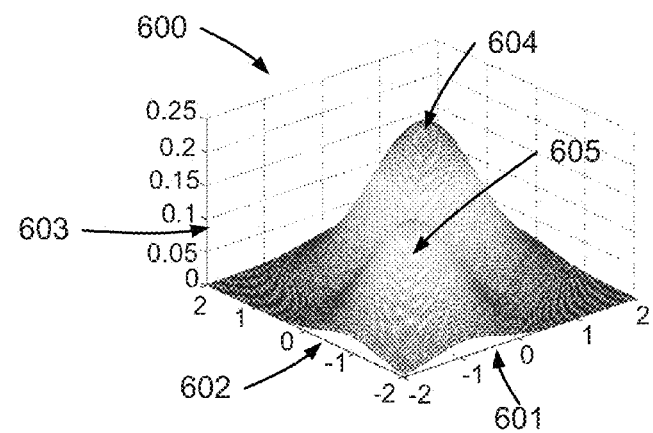
FIG. 6 is a three dimensional graph which illustrates a mixture of two 2D Gaussian distributions, a first Gaussian distribution having a higher probability and a second Gaussian distribution having a lower probability.

Reference is now made to FIG. 6, which is a three dimensional graph 600 which illustrates a mixture of two 2D Gaussian distributions 604 605, a first Gaussian distribution 604 having a higher probability and a second Gaussian distribution 605 having a lower probability.

A mixture of Gaussian distributions is characterized by the parameters of each Gaussian distribution and by a probability of each Gaussian. Many distributions, also other than Gaussian, may be approximated by a Gaussian mixture.

Mathematically a Gaussian mixture distribution may be represented as follows:

$$g(x \mid p_{1\ldots N}, \underline{\mu}_{1\ldots N}, C_{1\ldots N}) = \sum_{n=1}^{N} p_n \cdot f_x(x \mid \underline{\mu}_n, C_n) \quad \text{Equation 4}$$

Equation 4 presents a mixture of N Gaussians. Each of the Gaussians is associated with a probability denoted by $p_n$. A probability of obtaining a value x from such a distribution is given by a sum of Gaussian distributions—$f_x(\underline{x}|\underline{\mu}_n, C_n)$ scaled by their associated probabilities.

For simplifying exposition throughout the present application, examples are provided which assume only a single 2D Gaussian. However, a person skilled in the art will appreciate that embodiments of the invention may relate to mixtures of more than one Gaussian distribution, and for other formulations of distribution of points.

In some embodiments, polar coordinates are used, and the Gaussian distribution is described using polar coordinates. In such embodiments, a mean of a Gaussian distribution is a mean of radius values and phase values, and a covariance matrix is written as:

$$C = \begin{pmatrix} \text{variance(radius)} & 0 \\ 0 & \text{variance(phase)} \end{pmatrix}$$

In the above case the polar coordinates covariance matrix includes zero-valued elements because radius and phase are uncorrelated.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Descriptions of Embodiments of the Invention

A distribution of each cluster of points in a received constellation may optionally be at least approximated as a Gaussian mixture. An example embodiment below is described in context of a Gaussian mixture, although embodiments are not limited to the Gaussian mixture.

A case is considered in which a symbol was received at coordinates $\underline{x} = [I, Q]^T$.

The likelihood that the symbol is related to a cluster i is given by a distribution function of cluster i in coordinates $\underline{x} = [I, Q]^T$.

$$\text{Likelihood}_i = g(\underline{x}|p_{i,1\ldots n}, \underline{\mu}_{i,1\ldots n}, C_{i,1\ldots n}) \quad \text{Equation 5}$$

The Gaussian distribution has an exponential term, as shown in Equation 1. In some implementations it may be considered difficult or time consuming to calculate exponentials. In some embodiments selecting a cluster with a highest likelihood is performed by using log-likelihood. Since logarithmic and exponential cancel each other, and since log is a monotonic function, log-likelihood can serve for selecting a highest log-likelihood, which corresponds to a highest likelihood, in cases where the distribution of samples is approximated by a single Gaussian, such as depicted in FIGS. 4 and 5. In some embodiments Log-likelihood is calculated without calculating exponentials.

Assuming the distribution of all clusters in the received symbol space is known, a slicer should optionally select the cluster whose likelihood is the maximal among all symbols.

In some embodiments, a cluster is described by its distribution parameters.

In some embodiments, the distribution is taken to be a Gaussian distribution, and the parameters describing the cluster distribution are the mean and the covariance matrix of the cluster distribution.

For example, for 128 QAM, 128 means and 128 covariance matrices may be used to describe 128 symbol clusters.

For simplifying calculation, focus is optionally given to calculating a likelihood that a received symbol belongs to a cluster taken from a group of clusters geometrically near the received symbol.

Figure 7:
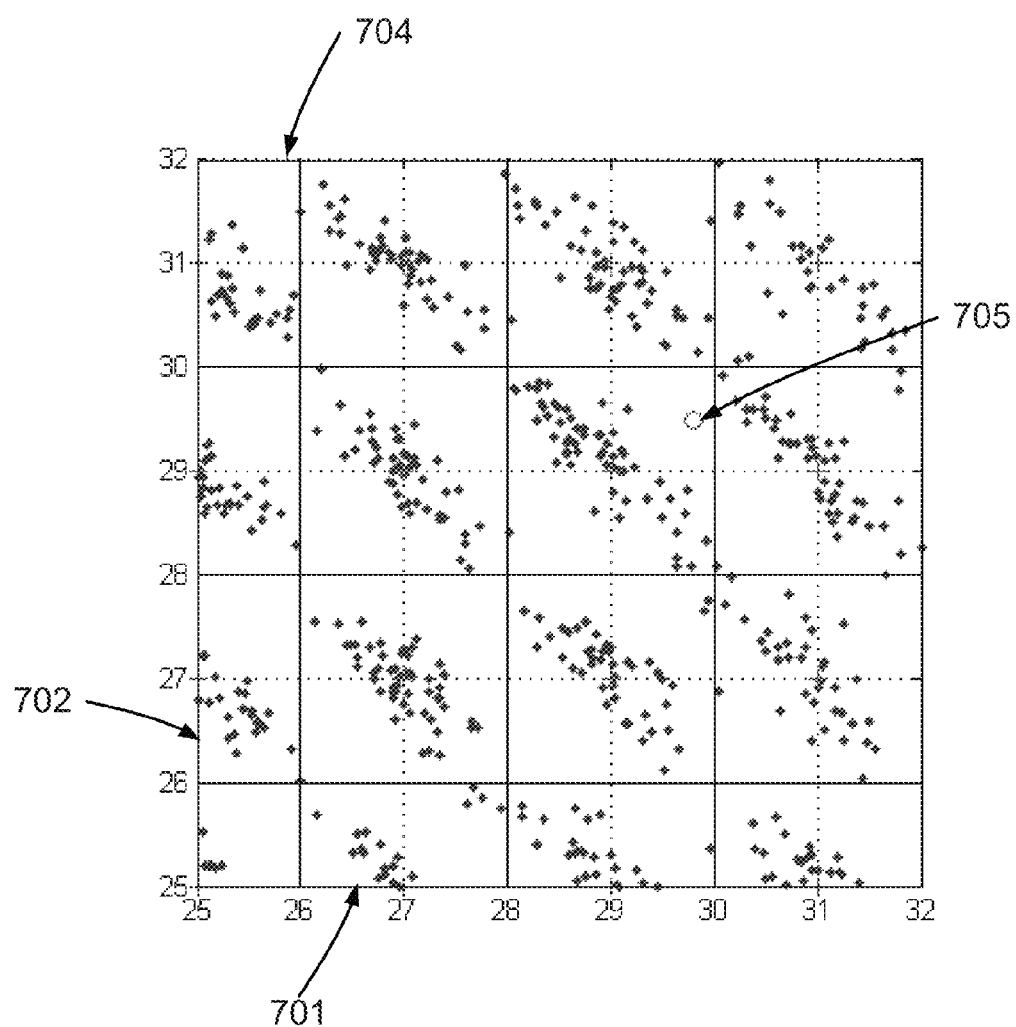
FIG. 7 is a simplified illustration of received symbols marked on a graph.

Reference is now made to FIG. 7, which is a simplified illustration of received symbols marked on a graph 704.

The graph 704 of FIG. 7 has an I axis 701 and a Q axis 702. The graph 704 cell lines designate standard slicing region boundaries.

FIG. 7 also depicts a specific received symbol 705 marked as a circle.

In some embodiments, a slicer should optionally select to assign the received symbol 705 a value corresponding to the value of the cluster whose likelihood is the maximal among all symbols.

In some embodiments only the clusters in the 9 cells adjoining the circle marking the specific received symbol 705 are considered as candidates for providing the value of the received signal 705. These 9 adjoining cells contain clusters which provide the highest likelihood that the specific received symbol 705 belongs to them. A cluster of received symbols which provides the highest likelihood among the clusters in the 9 cells is also usually the cluster which provides the highest likelihood among all the constellation clusters.

In some embodiment, cluster selections other than in the 9 adjoining cells may be considered as well, for example cells within circle surround the coordinates of the received symbol 705, or clusters within 16 cells, and possibly other geometrically adjacent selection schemes.

Figure 8:
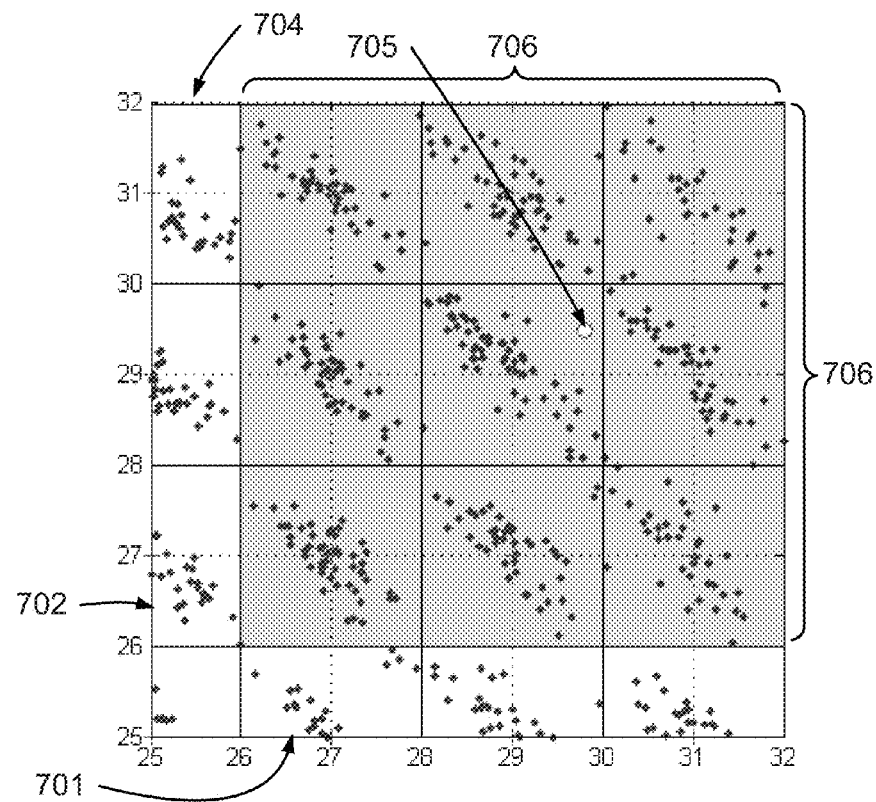
FIG. 8 is a simplified illustration of the graph of FIG. 7, with received symbols and a specific received symbol marked on the graph, and a selection of 9 cells highlighted.

Reference is now made to FIG. 8, which is a simplified illustration of the graph 704 of FIG. 7, with received symbols and a specific received symbol 705 marked on the graph 704, and a selection 706 of 9 cells highlighted.

Calculating using Equation 5 above, the cluster with the highest likelihood turns out to be the cluster associated with a transmitted symbol at a graph 704 cell centered at (31, 29).

Figure 9:
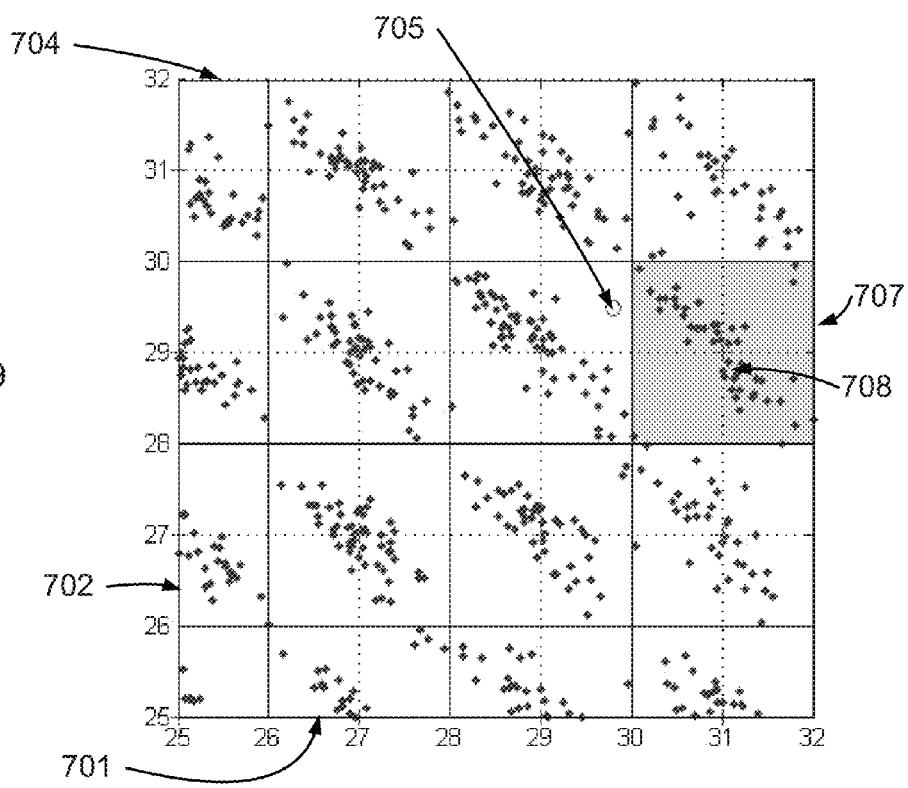
FIG. 9 is a simplified illustration of a section of the graph of FIG. 7, with received symbols and a specific received symbol marked on the graph, and a cell of the graph highlighted.

Reference is now made to FIG. 9, which is a simplified illustration of a section of the graph 704 of FIG. 7, with received symbols and a specific received symbol 705 marked on the graph 704, and a cell 707 of the graph 704 highlighted.

The highlighted cell 707 is contains a symbol cluster 708 which the specific received symbol 705 has a highest likelihood of belonging to. A person looking at FIGS. 7-9 might reach the same conclusion, that the specific received symbol 705 is closest to the cluster 708 in cell 707. However, a standard slicer grid based on the graph 704 would assign the specific received symbol 705 to the cell centered at (29, 29).

In some embodiments the logarithm of the likelihood for selected clusters is evaluated, and a cluster whose log-likelihood is the maximal is selected. The log-likelihood method of selection is potentially useful especially when cluster distribution is described with a single 2D Gaussian. A potential advantage of the log-likelihood method of selection is that it does not need to calculate exponential expressions.

In some embodiments, once a received symbol is associated with a specific cluster, parameters describing the specific cluster are optionally updated.

In a case where the distribution of received symbol values in a selected cluster is described using a single 2D Gaussian, optionally only the mean and the covariance matrix of the 2D Gaussian are updated. The updating is optionally performed using the following equations, with $\alpha$ as a constant which is used for determining a weight in the following averaging equation, $\alpha$ determining a rate of updating the mean vector and the covariance matrix.

$$\underline{\mu}_i = (1 - \alpha) \cdot \underline{\mu}_i + \alpha \cdot \underline{x} \qquad \text{Equation 6}$$

$$C_i = (1 - \alpha) \cdot C_i + \alpha \cdot \begin{pmatrix} (I - \mu_{I,i})^2 & (I - \mu_{I,i})(Q - \mu_{Q,i}) \\ (I - \mu_{I,i})(Q - \mu_{Q,i}) & (Q - \mu_{Q,i})^2 \end{pmatrix}$$

The index i in equation 6 indicates the parameters are those of cluster i.

It is noted that updating a cluster distribution which is described in terms of polar coordinates is performed similarly.

When the update parameter $\alpha$ is very small, an update of the mean and covariance parameters is slow. The mean and covariance parameters are therefore relatively stable. When the update parameter $\alpha$ is larger, the update is faster. A larger update parameter $\alpha$ is potentially suitable for initialization or for use when channel conditions change more rapidly.

In some embodiments the values for the update parameter are selected from a range where $0 \leq \alpha \leq 1$.

It is noted that Equation 6 for the mean may optionally use a different value of $\alpha$ than Equation 6 for the covariance matrix.

When more than one Gaussian is used for describing a distribution of points in a cluster, the probability that a given received symbol $\underline{x}$ is related to each of the Gaussians in the mixture is optionally first calculated, optionally as follows:

$$q_{i,n}(\underline{x}) = \text{prob}(\underline{x} \text{ is associated with Gaussin } n \text{ in cluster } i) =$$

$$\frac{f_x(\underline{x} \mid \underline{\mu}_{i,n}, C_{i,n})}{\sum_{m=1}^{N} f_x(\underline{x} \mid \underline{\mu}_{i,m}, C_{i,m})} \qquad \text{Equation 7}$$

Optionally, the mean and covariance of each of the Gaussians describing cluster i (a selected cluster), are updated, using the following equations:

$$\underline{\mu}_{i,n} = (1 - \alpha \cdot q_{i,n}(\underline{x})) \cdot \underline{\mu}_{i,n} + \alpha \cdot q_{i,n}(\underline{x}) \cdot \underline{x} \qquad \text{Equation 8}$$

$$C_{i,n} = (1 - \alpha \cdot q_{i,n}(\underline{x})) \cdot C_{i,n} +$$
$$\alpha \cdot q_{i,n}(\underline{x}) \cdot \begin{pmatrix} (I - \mu_{I,i,n})^2 & (I - \mu_{I,i,n})(Q - \mu_{Q,i,n}) \\ (I - \mu_{I,i,n})(Q - \mu_{Q,i,n}) & (Q - \mu_{Q,i,n})^2 \end{pmatrix}$$

The equation in Equation 8 above indicate that the update parameter $\alpha$, which was previously shown to control the rate of update, is now replaced by $\alpha \cdot q_{i,n}(\underline{x})$, that is, each Gaussian in the mixture updates its parameters at a rate proportional to the probability that the received symbol x is associated with it.

Optionally, the probabilities of the Gaussians in the mixture of the selected cluster is next updated, optionally as follows:

$$p_{i,n} = p_{i,n} \cdot (1-\alpha) + q_{i,n}(\underline{x}) \cdot \alpha \quad \text{Equation 9}$$

In some embodiments, variations on the equations above are used, including using a different value for the update parameter α for each of the parameters; that is for the mean, the covariance and the probability of each Gaussian distribution of each cluster.

In some embodiments, the update order is switched—first update the probability of each Gaussian and then update the mean and covariance matrix.

In some embodiments, the update parameter α optionally changes in time, optionally according to some criteria such as different values upon initialization as upon later operation, more rapid updates at times when rapid changes in values are detected, and so on.

In some embodiment other update equations which gradually change the parameters of the Gaussians are used. By way of a non-limiting example, the mean and variance of the last K samples are optionally calculated and the parameters of the Gaussians are updated accordingly.

In some embodiments a filter structure is used for obtaining new parameter values. In some embodiments, outliers which don't fit well in a distribution of the selected cluster are ignored, such as outliers beyond one, or two or some other integer or fractional multiple of a standard variation of the distribution.

In some embodiments the adaptive slicer is implemented only for a few of the received symbols, for example, if the magnitude of a received symbol is lower than some threshold—use the standard slicer; otherwise, use a smart slicer. Such embodiments potentially reduce implementation cost and complexity. A low magnitude received symbols may be treated as a symbol which is likely to be near the center (0, 0) of the standard grid, and symbols there are differentiated by a large difference in phase, therefore less likely to be mistaken. Phase noise and gain noise, which are usually termed multiplicative noise, have a lower effect at low magnitudes. Additionally, nonlinear distortions affect mainly large symbols.

In some embodiments the mean and covariance matrices are defined using polar coordinates instead of Cartesian coordinates. In such embodiments each Gaussian is characterized by a mean magnitude and a mean phase instead of mean I and mean Q values. The covariance matrix of a distribution relates to the magnitude and phase values of the symbols in each cluster.

Such embodiments may require converting Cartesian coordinates to polar and vice versa, but potentially provide an advantage that often the phase and magnitude components of the noise are uncorrelated; hence, potentially, off-diagonal components of the covariance matrix are zero. In such embodiments the off-diagonal components of the covariance matrix are optionally not calculated, potentially simplifying implementation.

In some embodiments initialization of the distribution parameters for each of the clusters is optionally done using predefined parameters.

An illustrative non-limiting example for how the distribution parameters may be evaluated a case is described in which there is an additive white Gaussian noise with a variance of $\frac{1}{2}\sigma_v^2$ per axis, a white Gaussian phase jitter with an RMS of $\sigma_\theta$ radians and a white Gaussian gain jitter with an RMS of $\sigma_g$.

A transmitted symbol located at $\{\mu_I, \mu_Q\}$ is considered. The phase of the transmitted symbol is denoted by $\phi$.

The initial parameters are optionally calculated as follows:

$$\mu = \{\mu_I, \mu_Q\} \quad \text{Equation 10}$$

$$C = \begin{bmatrix} \frac{1}{2}\sigma_v^2 + (\mu_I^2 + \mu_Q^2) \cdot (\sigma_\theta^2 \cdot \sin^2(\phi) + \sigma_g^2 \cdot \cos^2(\phi)) & (\mu_I^2 + \mu_Q^2) \cdot \sin(\phi) \cdot \cos(\phi)(\sigma_g^2 - \sigma_\theta^2) \\ (\mu_I^2 + \mu_Q^2) \cdot \sin(\phi) \cdot \cos(\phi)(\sigma_g^2 - \sigma_\theta^2) & \frac{1}{2}\sigma_v^2 + (\mu_I^2 + \mu_Q^2) \cdot (\sigma_\theta^2 \cdot \cos^2(\phi) + \sigma_g^2 \cdot \sin^2(\phi)) \end{bmatrix}$$

Similarly, the parameters are evaluated for different noise distributions as demonstrated above.

In some embodiments the slicer is optionally stored in terms of parameters describing distribution clusters.

In some embodiments the slicer is optionally calculated in advance for several conditions of noise.

In some embodiments a receiver optionally selects an appropriate slicer from a set of slicers calculated in advance according to a specific method, such as, by way of some non-limiting examples:

matching a pre-calculated slicer to a measured distribution of a specific cluster;

matching a pre-calculated slicer to a measured distribution of some specific clusters such as high-magnitude clusters;

matching a pre-calculated slicer to a measured distribution of all clusters;

receiving an instruction from a transmitter which slicer, from a set of slicers calculated in advance, to select.

In some embodiments the slicer is optionally stored in terms of a geometrical grid and its cell line boundaries.

In some embodiments the slicer is calculated in advance, and is optionally implemented using an array, such as a memory array. Optionally, coordinates of a received sample are converted to an address in the array. The content of the array in the address optionally contain a decision about the transmitted symbol corresponding to the received sample, and possibly additional information about the likelihood of the bits comprising the symbol.

Figure 10:
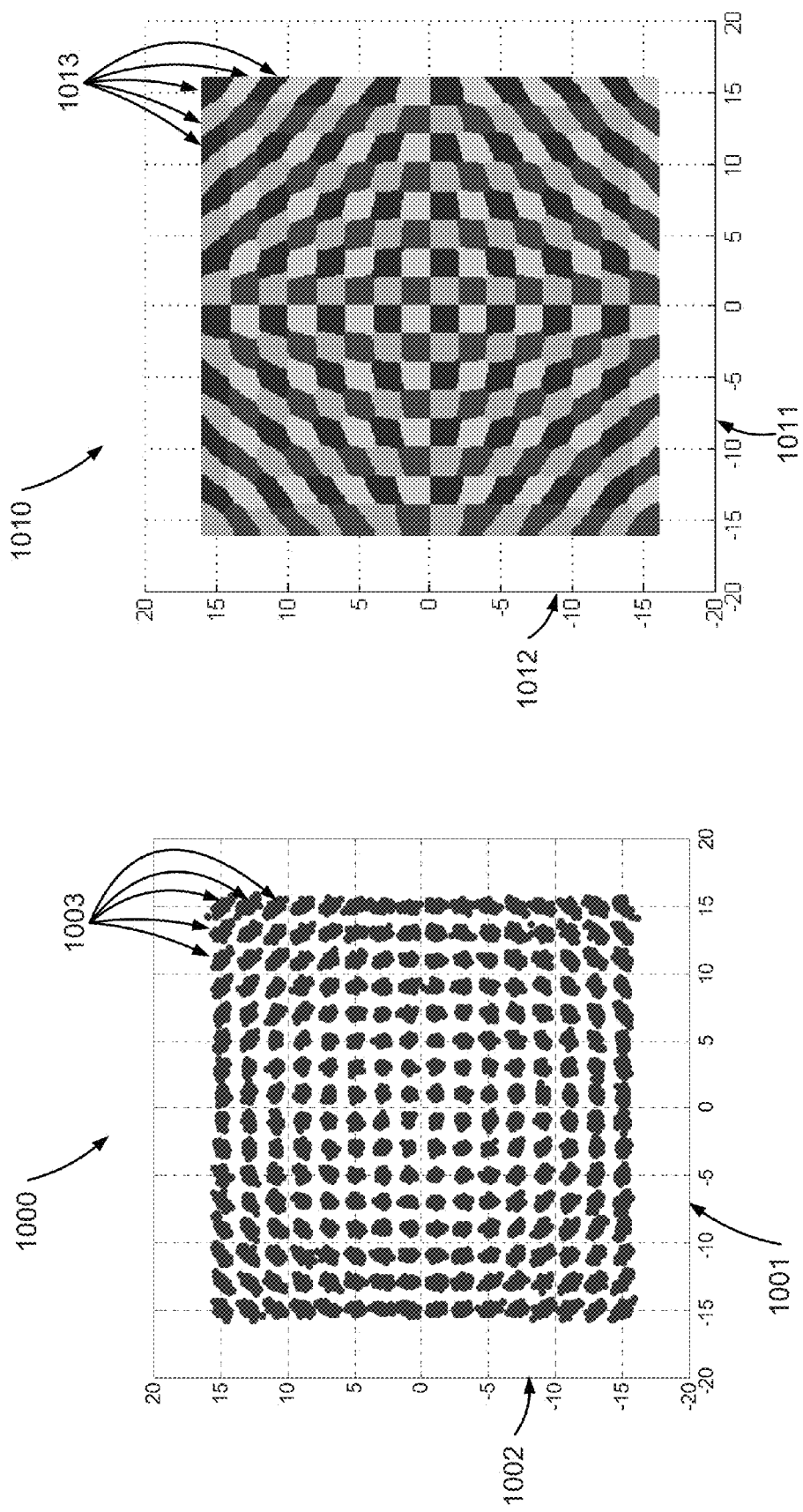
FIG. 10 is a simplified illustration of a first graph depicting a distribution of received samples of a 256 QAM modulation with phase noise and additive noise, and a second graph depicting decision areas obtained for the 256 QAM modulation.

Reference is now made to FIG. 10, which is a simplified illustration of a first graph 1000 depicting a distribution of received samples 1003 of a 256 QAM modulation with phase noise and additive noise, and a second graph 1010 depicting decision areas 1013 obtained for the 256 QAM modulation.

The first graph 1000 of FIG. 10 has an I axis 1001 and a Q axis 1002.

The second graph 1010 of FIG. 10 has an I axis 1011 and a Q axis 1012, and depicts decision areas 1013 in which received samples would be classified as a same symbol, corresponding to the distribution of the received samples 1003 of the 256 QAM modulation, because of the phase noise and the additive noise.

It is pointed out that symbols at the center of the graph 1010 have square decision areas. As magnitude increases the phase noise is more and more dominant and the decision area shapes change accordingly.

Figure 11A:
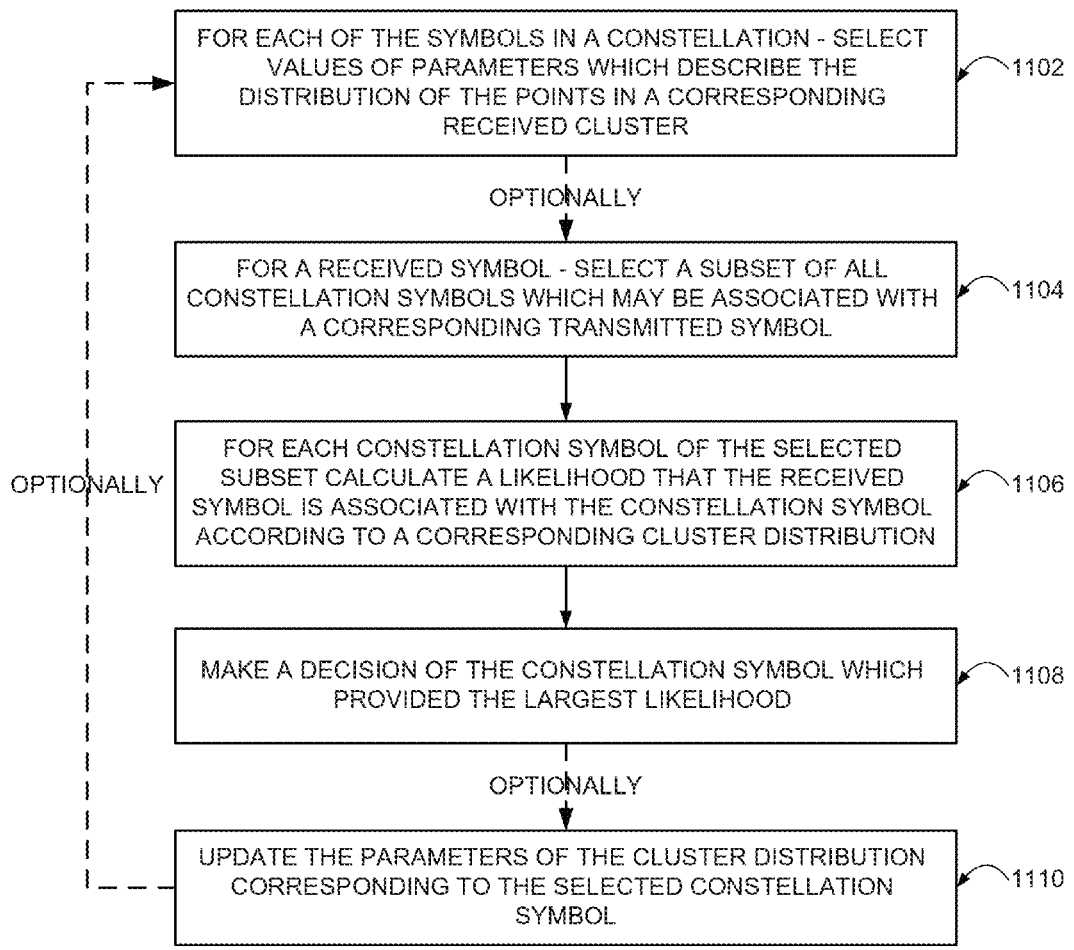
FIG. 11A is a simplified flow chart illustration of a method for a QAM receiver to decide a value of a received symbol of a QAM transmission according to an example embodiment of the invention.

Reference is now made to FIG. 11A, which is a simplified flow chart illustration of a method for a QAM receiver to decide a value of a received symbol of a QAM transmission according to an example embodiment of the invention.

The example illustration method includes:

Optionally preparing parameters for a decision method: for each of the symbols in a constellation—selecting values of parameters which describe the distribution of the points in a corresponding received cluster (1102).

By way of a non-limiting example, if the distribution is represented as a Gaussian mixture, select parameter values for one or more of the mean, covariance and probability of each Gaussian.

For the received symbol—selecting a subset of all constellation symbols which may be associated with a corresponding transmitted symbol (1104).

For each constellation symbol of the selected subset calculate a likelihood that the received symbol is associated with the constellation symbol according to a corresponding cluster distribution (1106).

In some embodiments the above calculation of likelihood is calculated as a log-likelihood.

Making a decision of the constellation symbol which provided the largest likelihood (1108) (or log-likelihood).

Optionally, updating the parameters of the cluster distribution corresponding to the selected constellation symbol (1110).

Following are some comments on the above flow chart:

The updating of the parameters of the cluster distribution is optional.

In some embodiments, the cluster parameters remain unchanged. A non-limiting example of a case where not updating is potentially useful is if a noise distribution is known and does not need to adapt. If there are several possibilities for the noise distribution, the decision method is optionally configured as to which parameters to use. Once the decision method is configured, optionally the decision method does not need to update parameters.

After calculating a likelihood of candidate symbols for decision, it is possible to calculate the log-likelihood ratio for each of the bits composing a symbol. This information is optionally used for error-correcting codes which can use information about the reliability of each of the bits in a codeword for potentially better decoding.

When a symbol is received, a cell with a largest likelihood is selected. In some cases two cells may each have a high likelihood. For example—when a symbol is near a boundary between the two cells. If a wrong cell is selected, in addition to deciding on wrong bits of data, the parameters of a wrong cell may be updated.

In some embodiments, an error correcting code is used to decide which of the cells is correct, such that updating is also performed to the parameters of the correct cell.

Figure 11B:
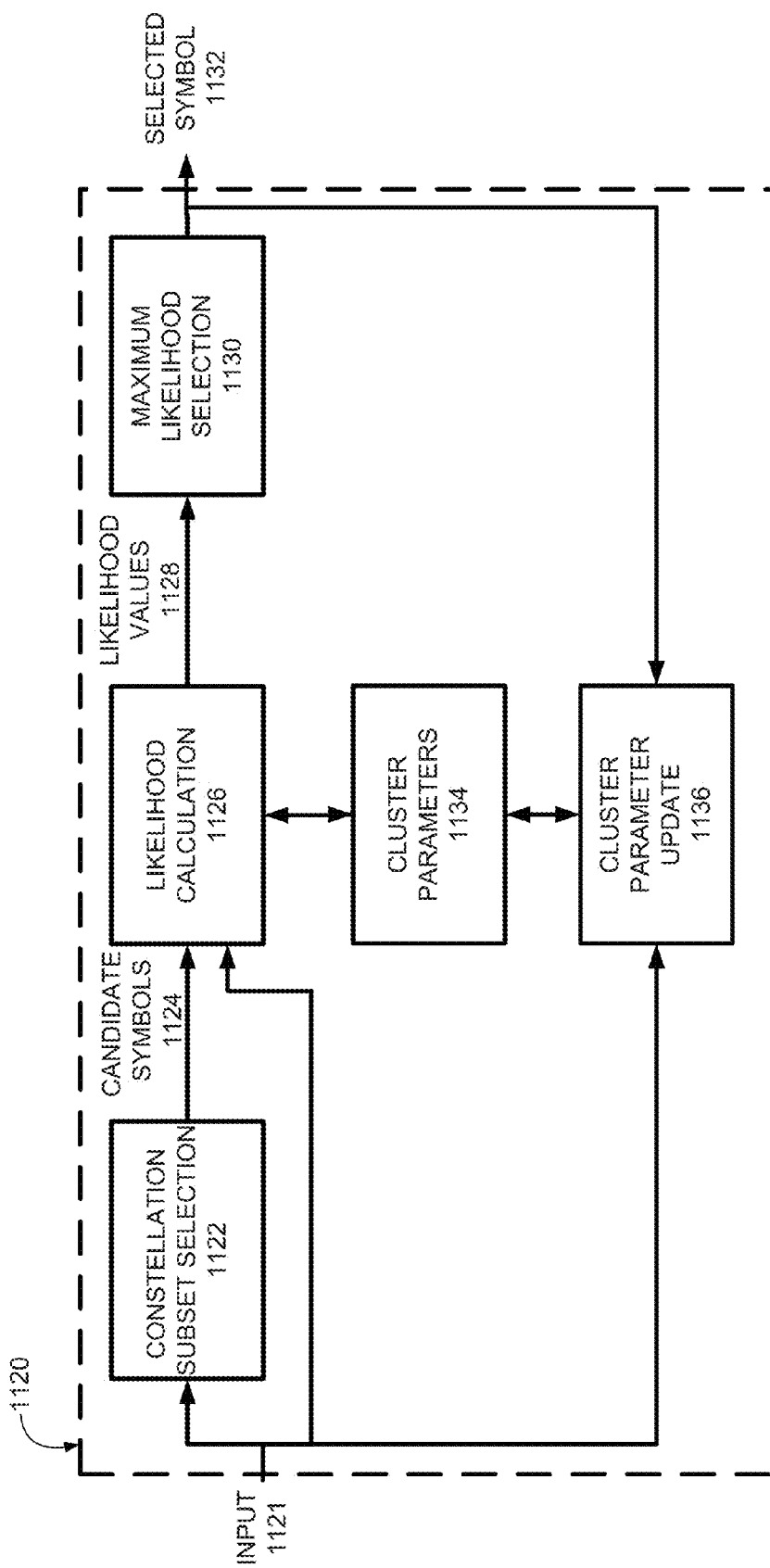
FIG. 11B is a simplified block diagram of an example embodiment of a dynamically adaptive slicer constructed according to an example embodiment of the invention.

Reference is now made to FIG. 11B, which is a simplified block diagram of an example embodiment of a dynamically adaptive slicer 1120 constructed according to an example embodiment of the invention.

The adaptive slicer receives input 1121 of a received sample, possibly, for example, an I value and a Q value of the received sample, or polar coordinate values of the received sample.

The input 1121 is received by a constellation subset selection unit 1122. The constellation subset selection unit 1122 produces an output of candidate symbols 1124. The candidate symbols 1124 are optionally symbols having coordinates from a vicinity of the input 1121.

In some embodiments, the candidate symbols 1124 are optionally selected using a standard slicer to obtain one candidate, and then select adjacent constellation points as additional candidates.

In some embodiments, the candidate symbols 1124 are optionally selected using the adaptive slicer to obtain one candidate, and then select adjacent constellation points as additional candidates.

The candidate symbols 1124, and the input 1121, are input to a likelihood calculation unit 1126. The likelihood calculation unit 1126 calculates, for each one of the candidate symbols 1124, the likelihood that the input 1121 is received when that one of the candidate symbols 1124 is transmitted. In order to calculate the likelihoods, the likelihood calculation unit 1126 also optionally receives input from a storage of cluster parameters 1134.

The likelihood calculation unit 1126 produces output of likelihood values 1128 for each one of the candidate symbols 1124.

A maximal likelihood selection unit 1130 selects which one of the candidate symbols 1124 is most likely to be the received input 1121 as a selected symbol 1132.

The selected symbol 1132 is also optionally fed into a cluster parameter update unit 1136, which may optionally read statistical parameters describing constellation parameters from the storage of cluster parameters 1134.

The cluster parameter update unit 1136 optionally updates the storage of cluster parameters 1134 with updated parameters at least for the selected symbol 1132.

Log-Likelihood Ratio (LLR) Evaluation

The LLR for a bit b is defined as follows:

$$LLR = \log\left(\frac{\sum_{x:b=1} f_{Y|X}(y\mid x)}{\sum_{x:b=0} f_{Y|X}(y\mid x)}\right) \quad \text{Equation 11}$$

$f_{Y|X}(y|x)$ denotes a likelihood that sample y is received when a bit x is transmitted.

Since a sample y has been received, the likelihoods $f_{Y|X}(y|x)$ of all possible symbols (x) in which b=1 is summed to calculate a likelihood that b is 1. Similarly, the likelihood that b=0 is also calculated. A ratio between the likelihoods is termed "likelihood ratio". Simplified expression and decoding are optionally obtained when a log of the likelihood ratio is used, known as log-likelihood-ratio (LLR).

Since a likelihood of each of the symbols near a received sample is calculated for taking decisions, the calculated likelihood values are optionally inserted into Equation 11. The effect of distant symbols, which are not likely candidates, on likelihood may, in some embodiments, optionally be neglected. Neglecting an effect of distant symbols in calculations in some embodiments yields an approximation which is usually sufficiently accurate.

In some embodiments, when a nominator or a denominator of an approximation to Equation 11 is zero, possibly because none of the candidate symbols had bit b equal to 1 or to 0, the zero value is optionally replaced by a small constant in order to avoid calculating with infinite values.

In some embodiments the LLR value is limited to a specific range.

In some embodiments, large LLR values are truncated to an appropriate, positive or negative, extremal limit.

In some embodiments, the likelihood calculation is performed as an approximate likelihood calculation, and/or as an approximate LLR. By way of a non-limiting example, in some embodiments a polynomial function is used to describe a cluster distribution, and/or a cluster distribution as an approximation to the Gaussian distribution.

Using Arrays and Other Data Structures for an Adaptive Slicer

A non-limiting example of use of an array is now provided. For an N-point square QAM constellation, an N-cell array may optionally be used, with Q and I values corresponding to columns and rows in the array. Upon receiving a received sample with specific Q and I values, a decision is optionally made about the symbol corresponding to the sample by reading the value of the symbol from column Q, row I of the array.

Having an array with more cells than possible symbol values in an N-QAM constellation potentially enables implementing an adaptive slicer.

By way of a non-limiting example, having an array with even 9 cells per QAM constellation point, for example a 9×1024 cell array for a 1024 QAM constellation, enables implementation of a modifiable slicer.

In some cases, having 9 array cells per QAM constellation point may not lead to much improvement in a slicer.

Having even more cells in an array, for example a 256×256 cell array or a 1024×1024 cell array potentially improves an adaptive slicer for 1024 QAM even more.

It is noted that the number of cells in the array should be at least as large as the number of constellation points. The larger the number of cells, the more flexibility is had in defining shapes of adaptive slicer array cells. By way of a non-limiting embodiment, in order to describe decision regions like in FIG. 10, graph 1010, more than 256 cells may be desired in an array.

In some embodiments a decision method for the adaptive slicer is implemented using an array, where coordinates of a received symbol are optionally converted to an address in the array, and contents of the array at the address optionally provide the value of the received symbol.

In some embodiments, the contents of the array at the address also provide a bit LLR value of the received symbol, as shown above in Equation 11 and its description.

In some embodiments the above-mentioned arrays are used to store pre-calculated modified slicers, optionally different pre-calculated slicers calculated for different specific noise models, and/or different specific modifications of transmission constellations.

In some embodiments an array adapts its contents according to a method such as described above with reference to FIG. 11A. A potential benefit of using an array is that there is no need for likelihood calculations for each received sample. Using the array is fast and simple. Adaptation of the array may optionally be done at a slower rate.

In some embodiments a data structure other than an array is used, such as an ordered list.

A Dynamically Adaptive Constellation Mapper

Since a dynamically adaptive slicer in a receiver can potentially cope with potentially hereto unused, odd or irregular shapes of constellation, some embodiments include adapting, or modifying, a transmitted constellation in a way which potentially minimizes error probability.

In some embodiments the transmitted constellation and slicer are calculated in advance and stored in a memory. In some embodiments the transmitted constellation and slicer are calculated in real-time during operation.

An adaptation algorithm is now described, which may, in some embodiments, optionally be implemented in real time, and in some embodiments may be calculated in advance and saved for later use.

In some embodiments an adaptive slicer optionally adapts in real time, as often as several times per second, if need be.

In some embodiments a transmission constellation is optionally modified in real time, as often as several times per second, if need be.

In some embodiments the slicer maintains parameters describing the Gaussian noise distribution per symbol. The probability that when symbol n is transmitted, a different symbol m is selected by the slicer is calculated.

The likelihood that symbol n is transmitted and a value of y is received is denoted by $f_n(y)$. Similarly, a likelihood that the symbol m is transmitted and a value of y is received is denoted by $f_m(y)$.

In order to calculate a probability that symbol m may be selected, when a symbol n is transmitted, $f_n(y)$ is integrated over all possible received values y in which $f_m(y) > f_n(y)$. Mathematically this is phrased as follows:

$$P_{n \to m} \leq \int f_n(y) \cdot IsBigger(f_m(y), f_n(y)) dy \qquad \text{Equation 12}$$

$$IsBigger(x, y) = \begin{cases} 1 & x > y \\ 0 & x \leq y \end{cases}$$

Equation 12 presents an upper bound on the probability that symbol m is selected, because Equation 12 includes also cases in which the likelihood of symbol m is larger than the likelihood of symbol n, but neither of the symbols is eventually selected. Still, the upper bound is a sufficiently tight bound, and practically, the upper bound can be calculated for a limited range of y values.

In some embodiments, the larger $P_{n \to m}$, the further a location of symbol n should be shifted away from a location of a symbol m. By taking into account all symbols which are near symbol n, and combining the direction and intensity which the symbol n needs to be shifted from each one of them, an effective direction for shifting symbol n is produced. The above is demonstrated in FIG. 12 which is described below.

Figure 12:
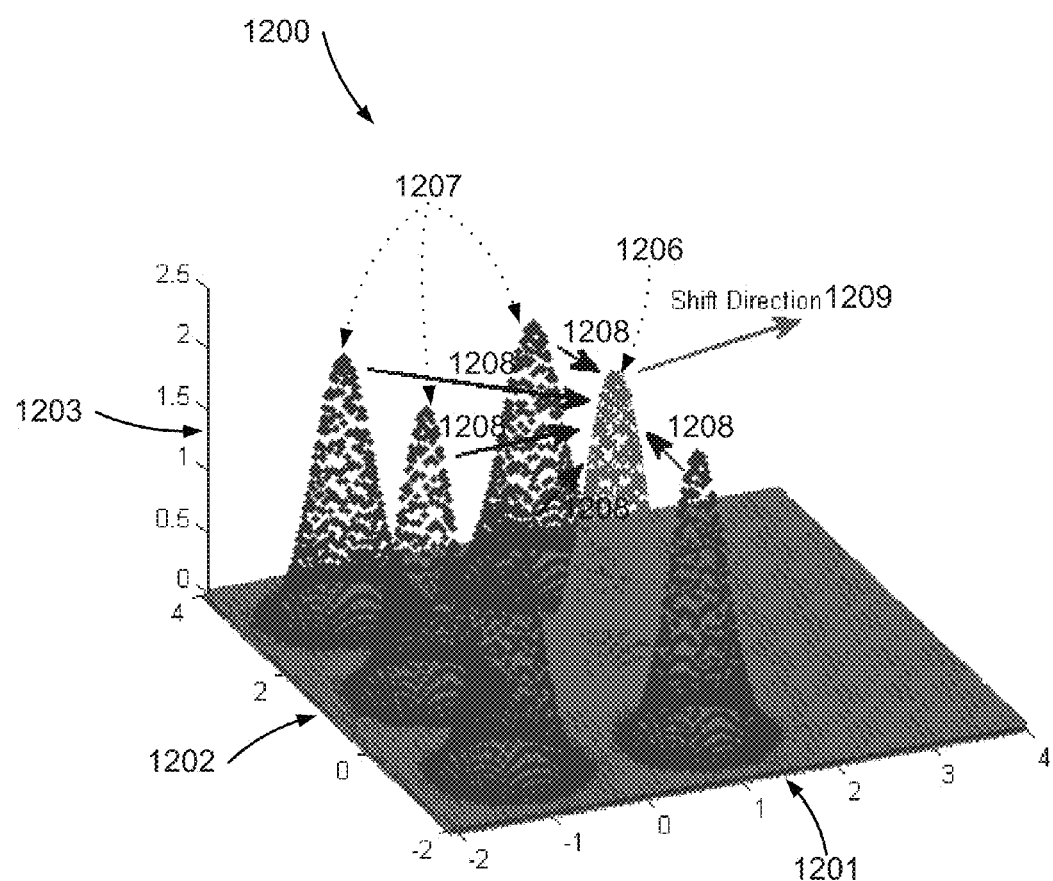
FIG. 12 is a three dimensional graph which illustrates a method for finding a direction in which a symbol should be shifted to reduces its error rate, according to an example embodiment of the invention.

Reference is now made to FIG. 12, which is a three dimensional graph 1200 which illustrates a method for finding a direction in which a symbol should be shifted to reduces its error rate, according to an example embodiment of the invention.

FIG. 12 depicts the three dimensional graph 1200 having a Q axis 1201, an I axis 1202 and a z-axis 1203 representing relative probability of occurrences of specific Q and I values.

FIG. 12 depicts a first probability distribution 1206 of a symbol n surrounded by additional probability distributions 1207 of neighboring constellation symbols. FIG. 12 also depicts vectors 1208, each of the vectors depicting a direction toward the first probability distribution 1206 of a symbol n and a magnitude equal to a probability that symbol n is selected when each of its neighbors is transmitted. Summing up the vectors 1208 produces a shift vector 1209, in which it can be potentially advantageous to shift a location of the symbol n among its neighboring constellation symbols. Shifting symbol n by shift vector 1209 can increase the distance between the location of symbol n and neighboring symbols which have a relatively high probability in being mistaken for being n, and potentially lowers a likelihood that the symbol n be given a value of one of its neighbors.

Optionally repeating the process of shifting for one, or more, or even all symbols in a constellation potentially generates an improved constellation. Shifting the constellation symbols is optionally repeated several times. Potentially, each time performance improves.

In some embodiments the improvement is measured, and shifting is repeated until the improvement is below a selected threshold.

In some embodiments, the improvement is measured in terms of bit error rate or signal to noise ratio in a received signal.

In some embodiments the shifting is repeated a fixed number of times.

Figure 13A:
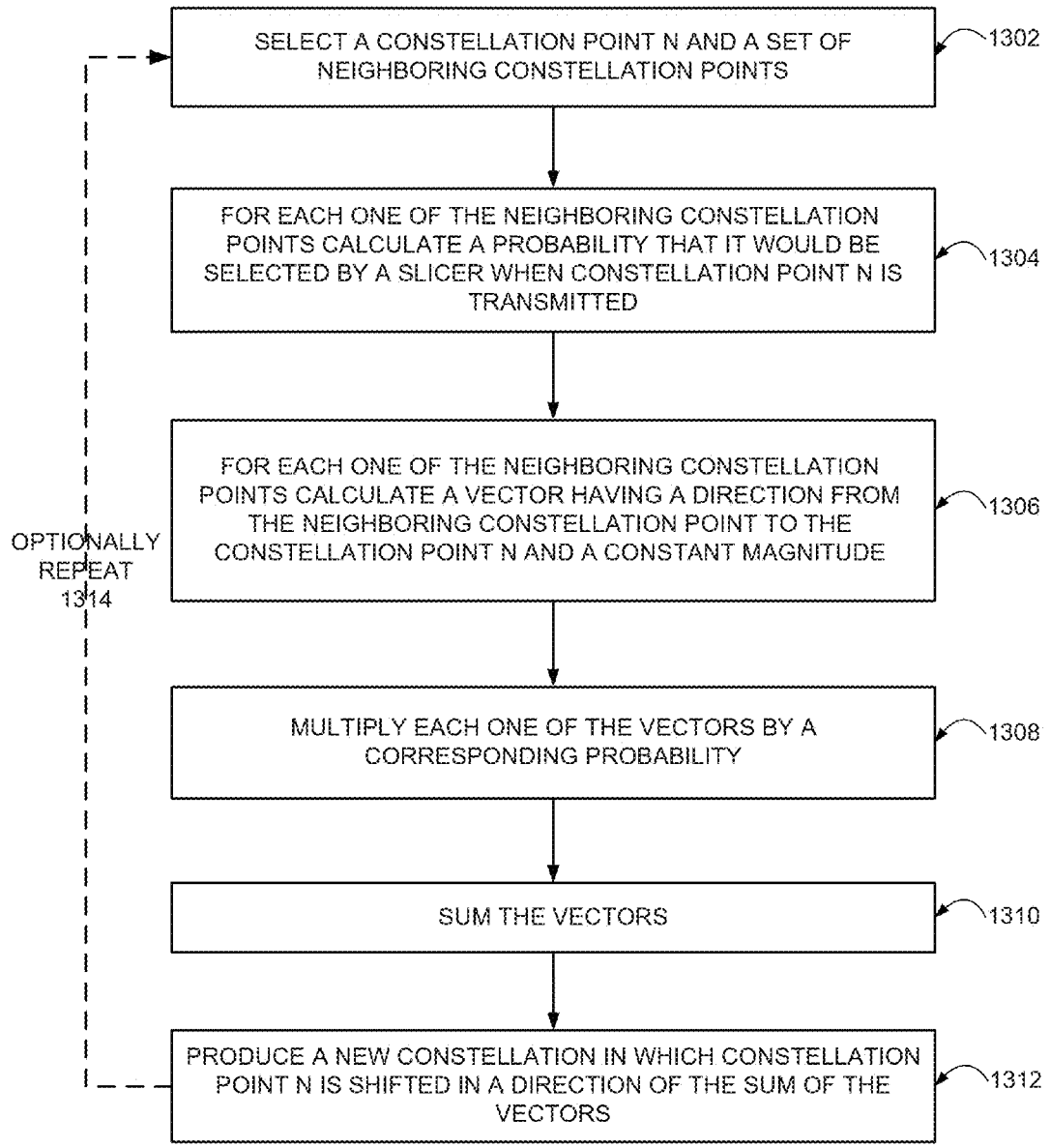
FIG. 13A is a simplified flow chart illustration of a method for a QAM transmitter to shift a constellation point position according to an example embodiment of the invention.

Reference is now made to FIG. 13A, which is a simplified flow chart illustration of a method for a QAM transmitter to shift a constellation point position according to an example embodiment of the invention.

The example illustration method includes:

Selecting a constellation point N and a set of neighboring constellation points (1302).

For each one of the neighboring constellation points calculating a probability that it would be selected by a slicer when constellation point N is transmitted (1304).

It is noted that the probability may be calculated by the method of Equation 12.

For each one of the neighboring constellation points calculating a vector having a direction from the neighboring constellation point to the constellation point N and a magnitude of some constant (1306), for example a magnitude of one.

Optionally multiplying each one of the vectors by a corresponding probability (1308).

Summing the vectors (1310).

Producing a new constellation in which constellation point N is shifted in a direction of the sum of the vectors (1312).

The method described above may optionally be repeated, optionally until an improvement is measured or a fixed number of times, as mentioned above.

The method of FIG. 13A potentially optimizes the location of a constellation point.

In some embodiments a starting constellation for a process of constellation improvement or optimization may be any constellation.

By way of some non-limiting examples, starting constellations may optionally include: constellations for which there is a natural division to square cells; constellations for which there is a natural division to hexagonal cells; and even irregularly shaped constellation cells.

By natural division to some specific shape of cells it is meant that optimal performance under pure AWGN conditions is potentially obtained when decision regions or cells have the specific shape.

It is noted that at outer edges of a constellation some points have adjacent points in fewer directions than in the center of the constellation, optionally resulting in a modified optimal cell shape.

In some embodiments the outer points are disregarded when determining whether a constellation has a natural division to some shape.

Figure 13B:
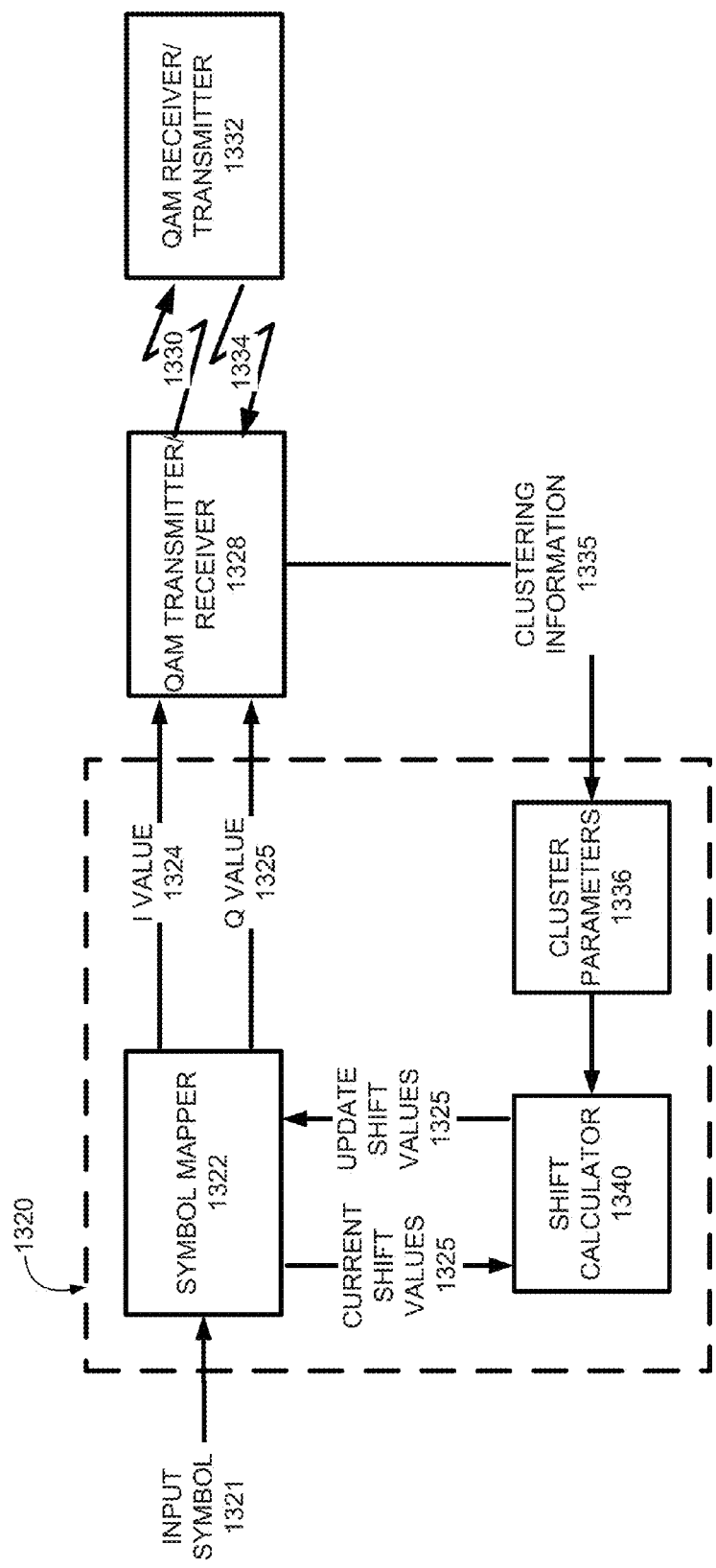
FIG. 13B is a simplified block diagram of an example embodiment of a dynamically adaptive constellation mapper constructed according to an example embodiment of the invention.

Reference is now made to FIG. 13B, which is a simplified block diagram of an example embodiment of a dynamically adaptive constellation mapper 1320 constructed according to an example embodiment of the invention.

The dynamically adaptive constellation mapper 1320 receives input of a symbol 1321 for transmission. The input symbol may be, by way of a non-limiting example, an N-bit symbol. The input symbol 1321 is converted into an I value 1324 and a Q value 1325 based on a mapping known by the symbol mapper 1322. Optionally, the symbol mapper 1322 may know some initial constellation mapping.

The symbol mapper 1322 calculates an I value 1324 and a Q value 1325 associated with the input symbol 1321 by a mapping, for example an initial mapping.

The I value 1324 and the Q value 1325 are fed to a QAM transmitter/receiver 1328, which transmits 1330 a signal corresponding to the input symbol 1321 to a QAM receiver/transmitter 1332.

The QAM receiver/transmitter 1332 optionally transmits 1334 a signal which contains clustering information 1335 about received symbols back to the QAM transmitter/receiver 1328, which sends the clustering information 1335 to a cluster parameters unit 1336.

The cluster parameters unit 1336 optionally sends the clustering information 1335 to a shift calculator 1340.

The shift calculator 1340 optionally reads current constellation shift values 1325 from the symbol mapper 1322, and optionally calculates updated constellation shift values 1325 based on the current constellation shift values 1325 and the clustering information 1335.

The shift calculator 1340 optionally sends the updated constellation shift values 1325 to the symbol mapper 1322 for use in mapping subsequent symbols.

In some embodiments the initial mapping may optionally include zero shifts from some standard constellation.

In some embodiments the initial mapping may optionally include non-zero shifts from some standard constellation, or even some non-standard initial mapping.

Some of the exemplary initial mappings, or starting constellations, are exemplified in the following FIGS. 14, 15 and 16.

Figure 14:
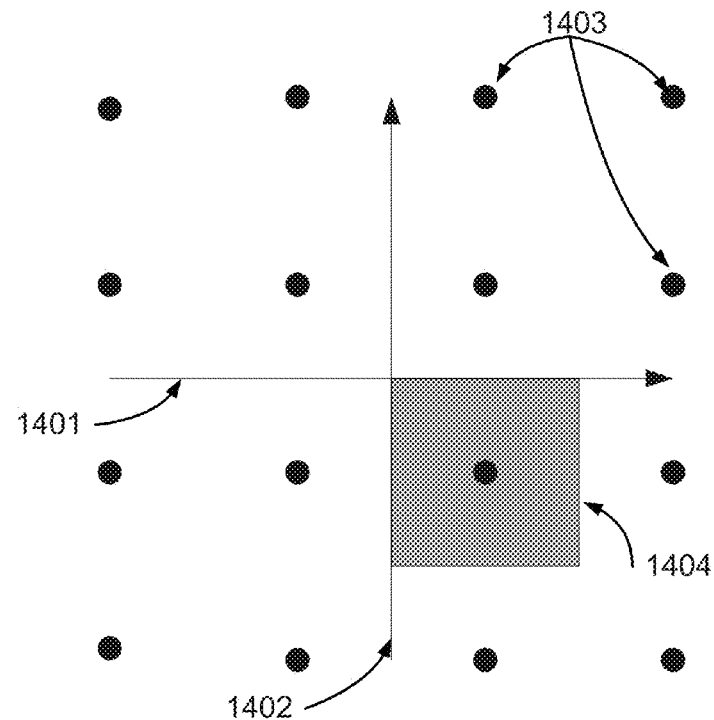
FIG. 14 is a simplified illustration of a portion of a constellation with a natural division to square cells, according to an example embodiment of the invention.

Reference is now made to FIG. 14, which is a simplified illustration of a portion of a constellation with a natural division to square cells 1404, according to an example embodiment of the invention.

FIG. 14 depicts an I axis 1401 and a Q axis 1402, and constellation points 1403. A natural cell 1404 shape of the constellation depicted in FIG. 14 is square.

Figure 15:
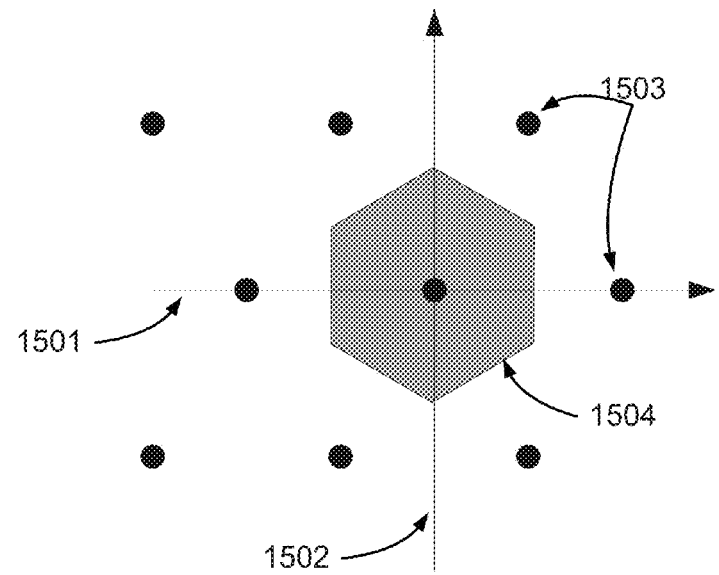
FIG. 15 is a simplified illustration of a portion of a constellation with a natural division to hexagonal cells, according to an example embodiment of the invention.

Reference is now made to FIG. 15, which is a simplified illustration of a portion of a constellation with a natural division to hexagonal cells 1504, according to an example embodiment of the invention.

FIG. 15 depicts an I axis 1501 and a Q axis 1502, and constellation points 1503. A natural cell 1504 shape of the constellation depicted in FIG. 15 is hexagonal.

Figure 16:
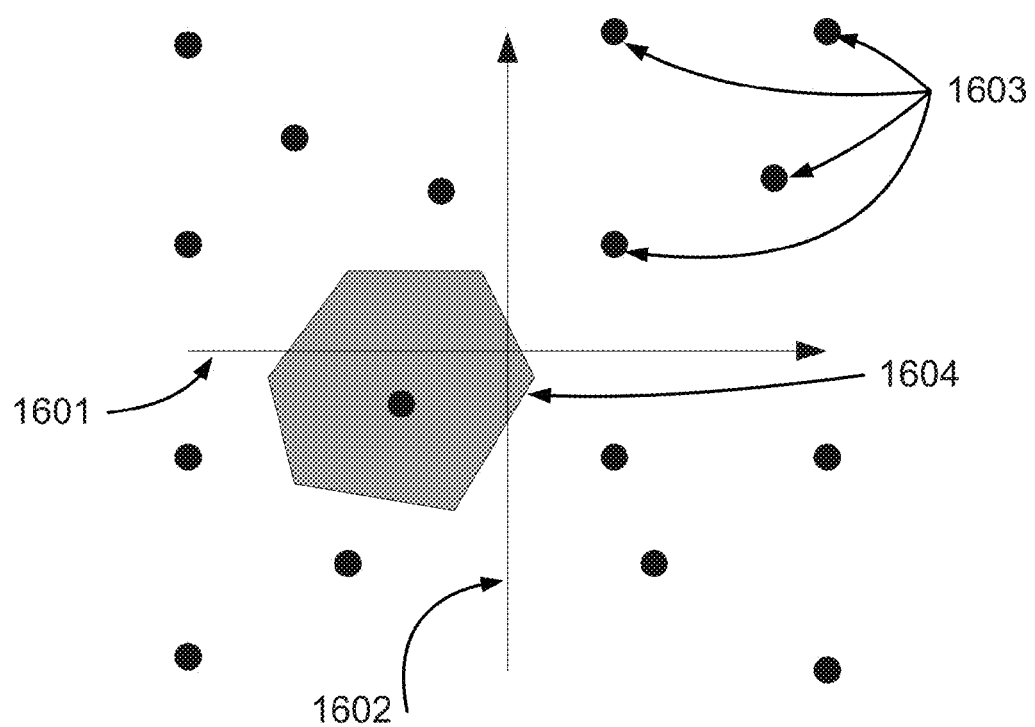
FIG. 16 is a simplified illustration of a portion of a constellation with a natural division to irregularly shaped cells, according to an example embodiment of the invention.

Reference is now made to FIG. 16, which is a simplified illustration of a portion of a constellation with a natural division to irregularly shaped cells 1604, according to an example embodiment of the invention.

FIG. 16 depicts an I axis 1601 and a Q axis 1602, and constellation points 1603. A natural cell 1604 shape of the constellation depicted in FIG. 16 is an irregular shape.

Reference is now again made to the flow chart of FIG. 13A.

In some embodiments alternative options are used in the method illustrated by the flow chart.

In some embodiments, the probabilities calculated in the second block 1304 are optionally normalized by a factor. As a non-limiting example the factor may be a total symbol error rate of the constellation.

In some embodiments, the probabilities calculated in the second block 1304 are optionally limited to a range of values. In some embodiments very large values are optionally clipped.

Other than scaling and clipping the probabilities of the second block 1304, other functions may be applied to the probabilities. In some embodiments a polynomial function multiplies the probabilities, optionally emphasizing a specific range of probabilities.

In some embodiments, in the second block 1302, instead of calculating the probability that point N is transmitted and another point is selected, the probability that point N is selected when another point is transmitted is optionally used.

In some embodiments, the results of the multiplications in the fourth block 1308 are once again optionally scaled, clipped, or transformed, for example by a polynomial function. Clipping is optionally done by maintaining the direction of the vector, and modifying its magnitude. Scaling is optionally done while maintain the direction of the vector.

In some embodiments, after the fifth block 1310 a vector is added in the direction of the origin. The addition exerts a force which slows down or limits expansion of the constellation. In some embodiments the vector is optionally proportional to the magnitude of the symbol destined for shifting and/or related to the magnitude of the symbol by some other mathematical form.

In some embodiments a location of a first subset of the constellation points is modified and a location of a second subset of the points remains unchanged.

In some embodiments the location of a subset of the constellation points is optionally modified using the above-described method, and the location of the rest of the symbols is optionally modified by using symmetry rules. For example, in some embodiments the upper half of a constellation is modified using the above-described method and the location of the points in the lower half is set using a 180 degree rotation or a mirror image.

In some embodiments, updating a constellation is optionally implemented by a transmitter which obtains feedback from a receiver. The feedback optionally includes general noise parameters such as one or more of: phase noise variance, gain noise variance, gain imbalance mean and variance, phase imbalance mean and variance, or alternatively, parameters describing the noise distribution of all, or even each one of, the constellation points, for example, the mean vector and covariance matrix of a Gaussian model or a Gaussian mixture model.

In some embodiments, once the transmitter obtains the feedback the transmitter may change the constellation.

In some embodiments the receiver's slicer and LLR calculator optionally tracks changes adaptively, as described in the section about the slicer.

In some embodiments, the transmitter optionally informs the receiver about the shift of the constellation point coordinates, and the receiver optionally calculates slicer cells to suit the shift, optionally using the Gaussian noise parameters as described in the section about the slicer.

Producing Pre-Calculated Slicers

As mentioned above, different pre-calculated slicers and or constellations may be produced, and even optionally stored. Storing a slicer may optionally be made as an array, and/or as a collection of parameters, such as statistical parameters, describing symbol clusters under specific conditions. Storing a constellation may optionally be made as a collection of phase and amplitude values, and/or as a collection of phase and amplitude shifts.

In some embodiments, pre-calculated slicers and/or constellations are pre-calculated by performing simulations on a computer.

In some embodiments, pre-calculated slicers and/or constellations are produced by adaptive transmitters and/or adaptive slicers under actual field use. Optionally slicers and/or constellations are read from instruments in the field, and stored, optionally together with a description under what conditions the slicers and/or constellations were produced.

Using Pre-Calculated Slicers

In some embodiments, the receiver optionally switches using pre-calculated slicers for a period of time, and optionally selects a pre-calculated slicer which provides a lowest symbol error rate.

In some embodiments, the transmitter optionally switches using pre-calculated constellations for a period of time, and optionally selects a pre-calculated constellation which a receiver reports as providing a lowest symbol error rate.

In some embodiments, the transmitter and the receiver optionally switch using pre-calculated constellations and pre-calculated slicers for a period of time, and optionally select a combination of pre-calculated constellation and slicer which the receiver reports as providing a lowest symbol error rate.

It is expected that during the life of a patent maturing from this application many relevant symbol modulation methods will be developed and the scope of the terms adaptive slicer and adaptive constellation are intended to include all such new technologies a priori.

The terms "comprising", "including", "having" and their conjugates mean "including but not limited to".

The term "consisting of" is intended to mean "including and limited to".

The term "consisting essentially" of means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental calculated support in the following examples.

EXAMPLES

Reference is now made to the following examples, which together with the above descriptions illustrate some embodiments of the invention in a non limiting fashion.

Reference is now made to FIGS. 17A-17D, which illustrate results obtained for a 128-QAM constellation, using an example embodiment of the invention.

Figure 17B:
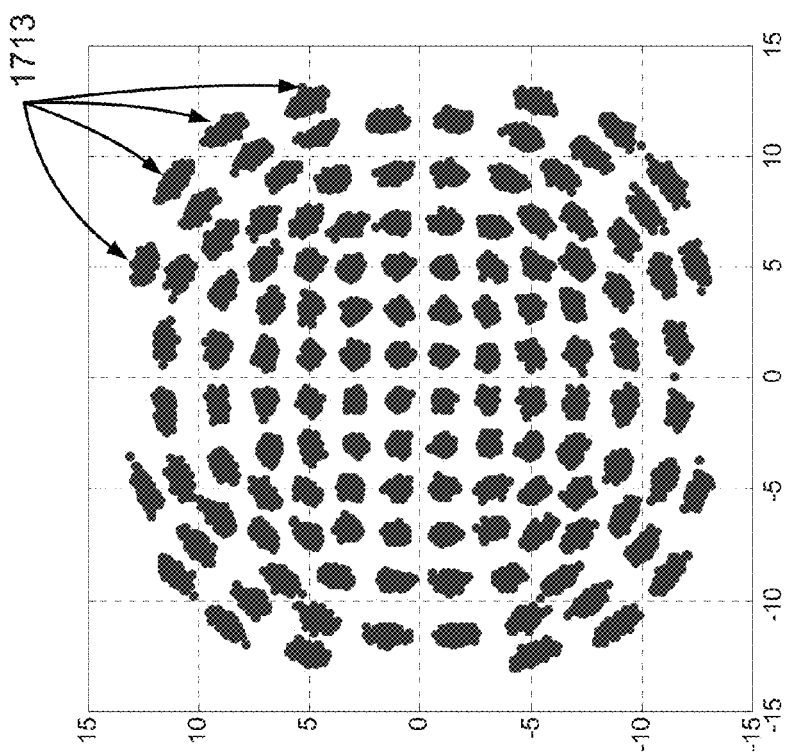
FIGS. 17A-17D illustrate results obtained for a 128-QAM constellation, using an example embodiment of the invention.
Figure 17A:
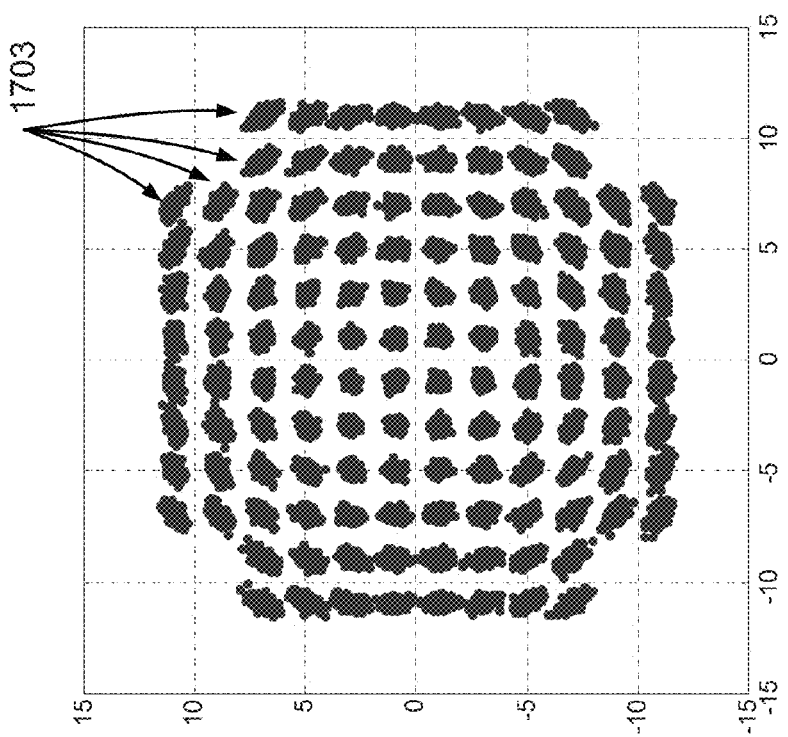

FIG. 17A depicts received symbols 1703 of the 128-QAM constellation under thermal and phase noise conditions, when using a standard 128-QAM constellation.

FIG. 17B depicts received symbols 1713 of the 128-QAM constellation under thermal and phase noise conditions when using a shifted-points 128-QAM constellation using an example embodiment of the invention.

Figure 17D:
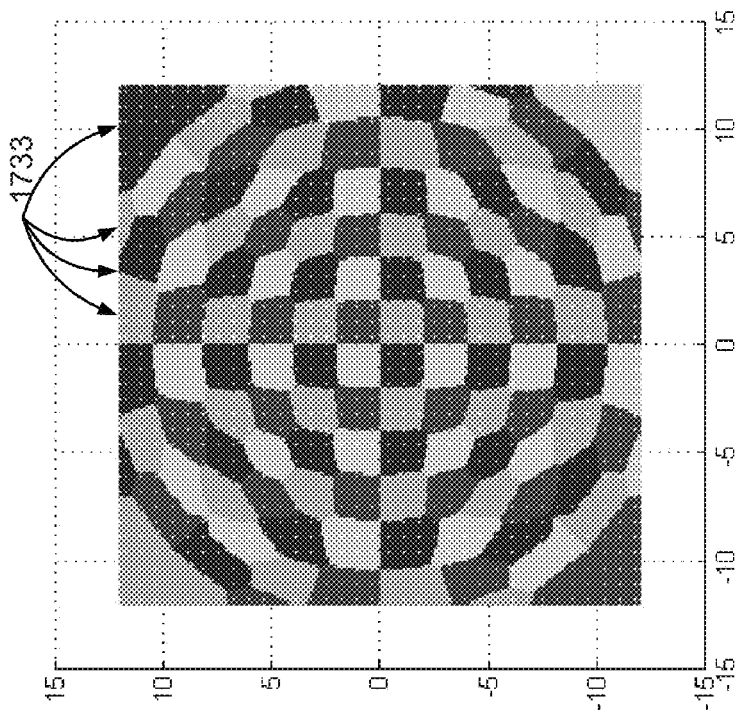
Figure 17C:
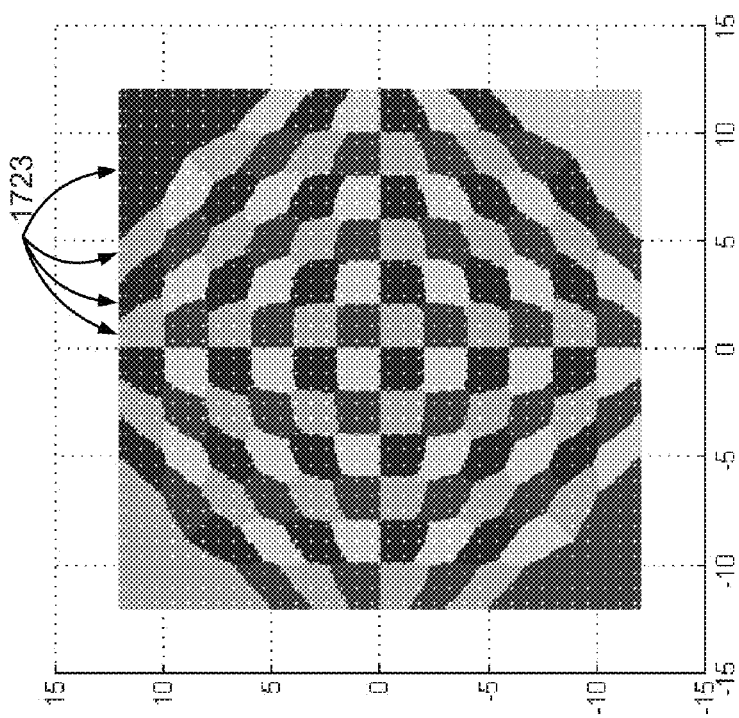

FIG. 17C depicts decision areas 1723 optimized by an adaptive slicer according to an example embodiment of the invention for the received symbols 1703 of the 128-QAM constellation of FIG. 17A.

FIG. 17D depicts decision areas 1733 optimized by an adaptive slicer according to an example embodiment of the invention for the received symbols 1713 of the shifted-points 128-QAM constellation of FIG. 17B.

Figure 18:
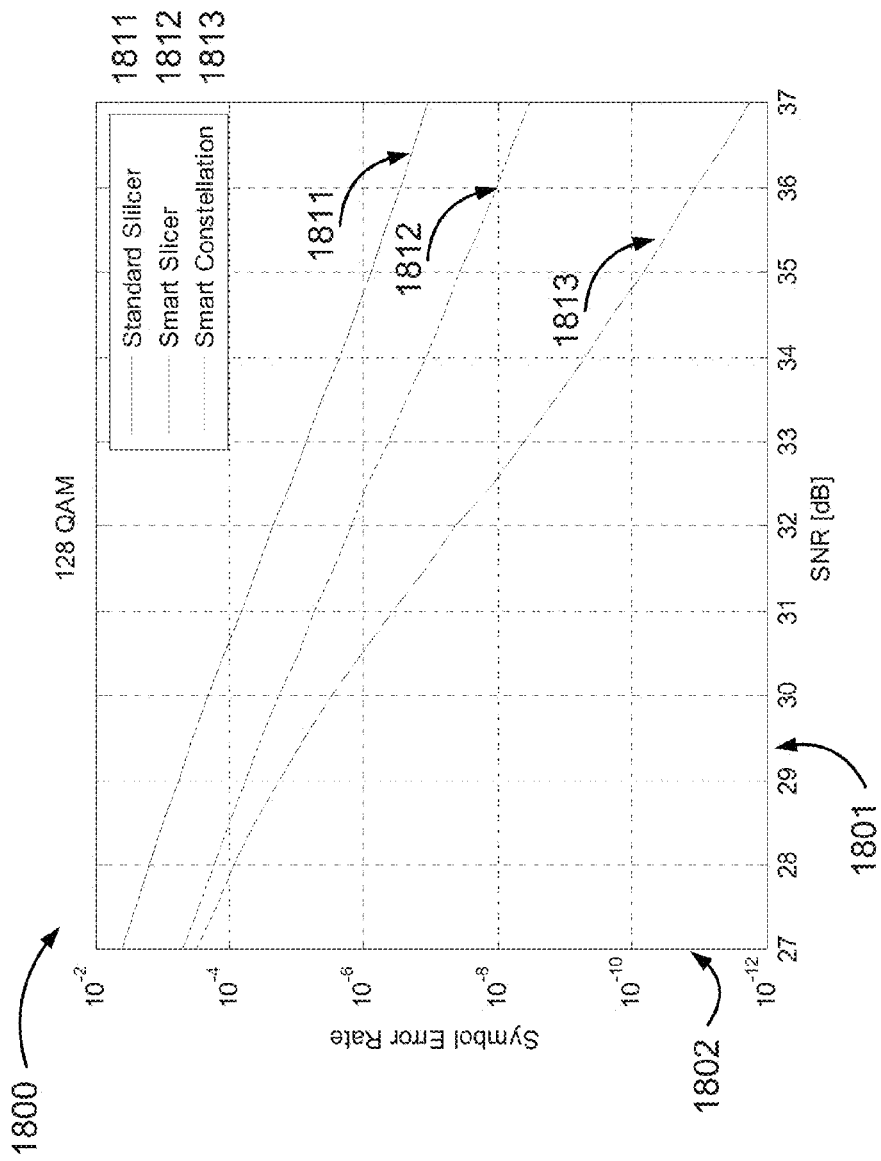
FIG. 18 is a graph illustrating improvements in Symbol Error Rate receiving a 128-QAM transmission using example embodiments of the invention over using a standard constellation and a standard slicer.

Reference is now made to FIG. 18, which is a graph 1800 illustrating improvements in Symbol Error Rate receiving a 128-QAM transmission using example embodiments of the invention over using a standard constellation and a standard slicer.

FIG. 18 depicts a graph 1800 with three lines 1811 1812 1813 illustrating symbol error rates as a function of Signal to Noise Ratio under three conditions: a first line 1811 using a standard constellation and a standard slicer; a second line 1812 using a standard constellation and an adaptive slicer; and a third line 1813 using an optimized constellation and an adaptive slicer adapted to the optimized constellation.

The graph 1800 of FIG. 18 has an x-axis 1801 depicting simulated channel Signal to Noise Ratio in units of dB, and a y-axis 1802 depicting Symbol Error Rate.

Optimizing a constellation potentially depends on a starting point, that is, on which constellation was the initial constellation before shifting constellation points.

In some embodiments the method described above for shifting points and optionally optimizing a constellation is not limited to a standard square cell constellation.

By way of a non-limiting example, a 1024 QAM constellation embedded in thermal noise and phase noise is now considered.

Figure 19:
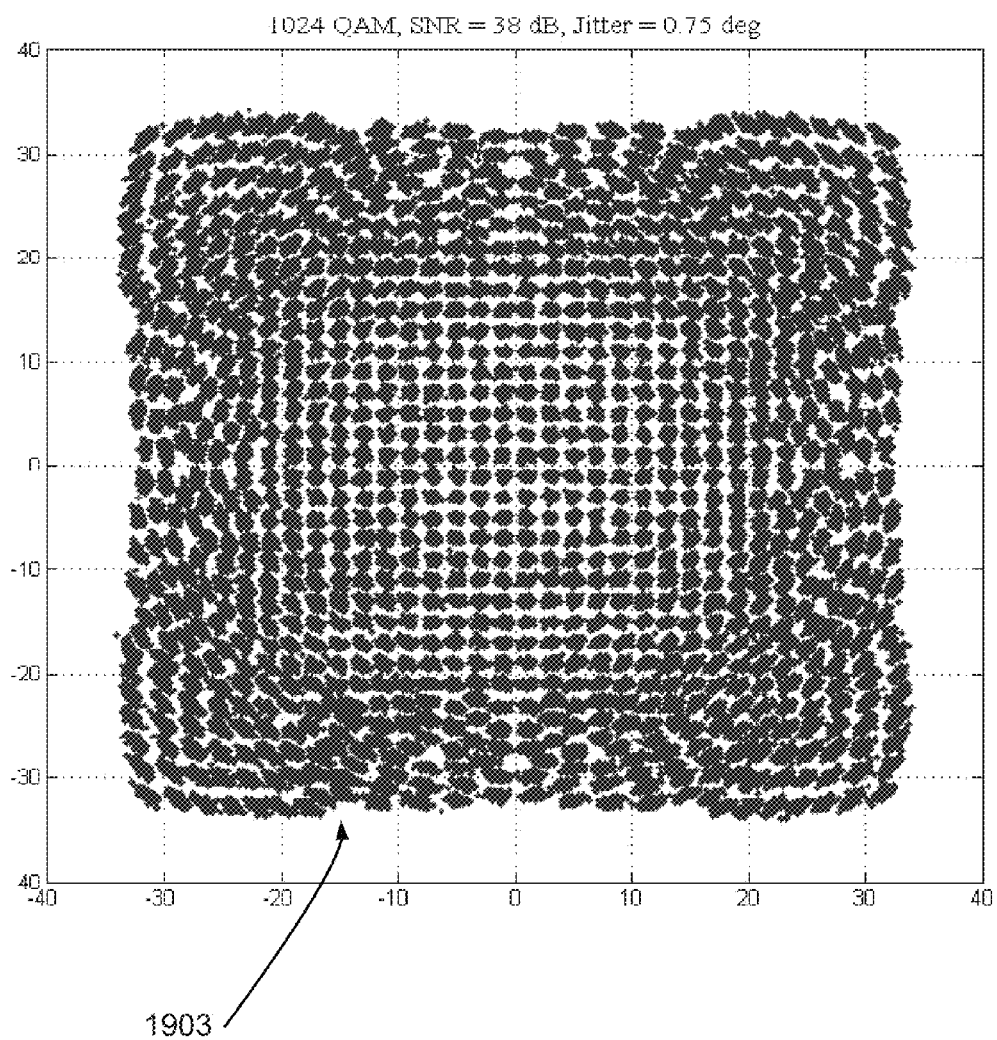
FIG. 19 depicts a 1024 QAM, square-cell based constellation optimized under thermal noise and phase noise conditions according to an example embodiment of the invention.

Reference is now made to FIG. 19, which depicts a 1024 QAM, square-cell based constellation optimized under thermal noise and phase noise conditions according to an example embodiment of the invention.

FIG. 19 depicts distribution clusters 1903 of received samples of the optimized constellation, under conditions of SNR=38 dB and phase jitter=0.75 degrees.

Figure 20:
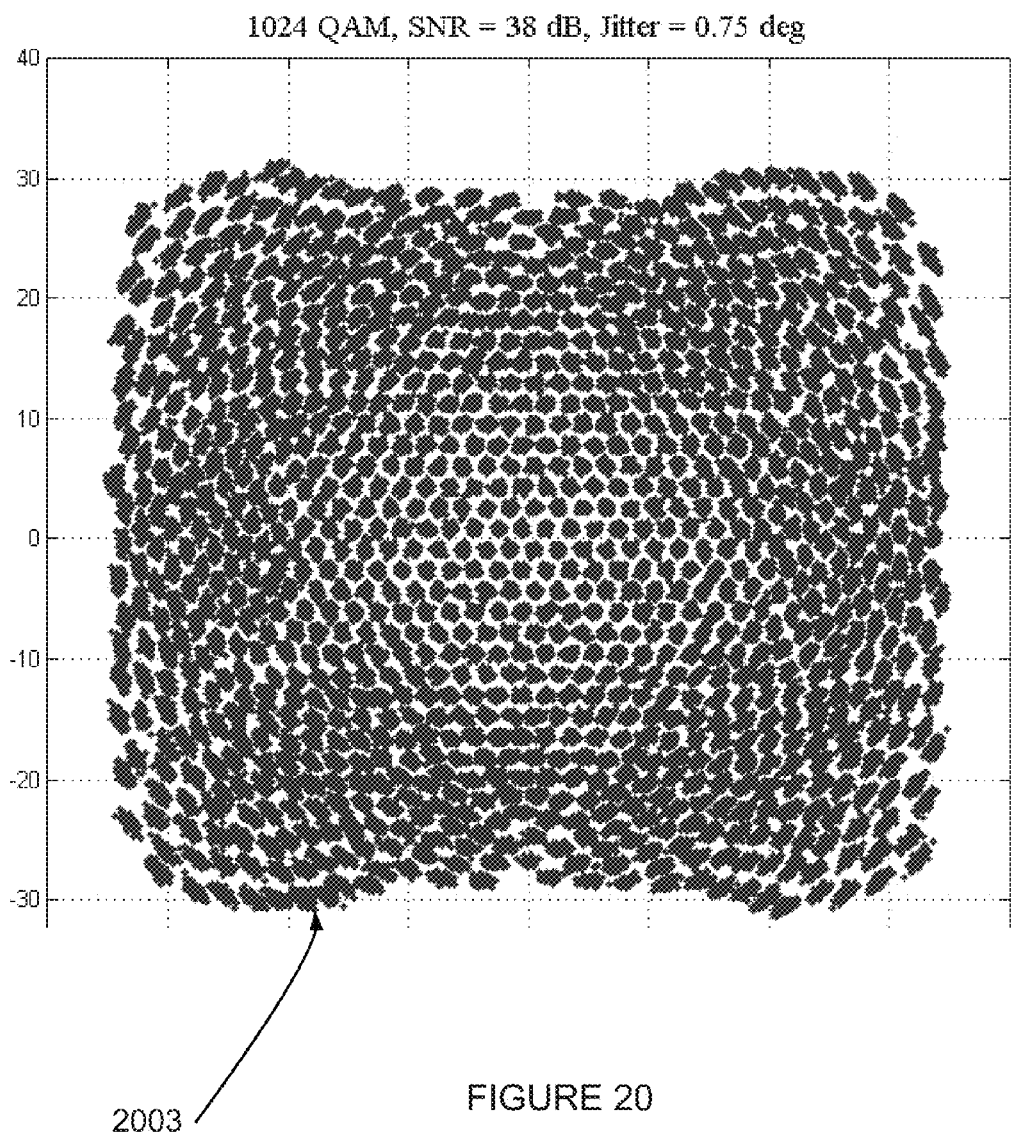
FIG. 20 depicts a 1024 QAM, hexagonal-cell based constellation optimized under thermal noise and phase noise conditions according to an example embodiment of the invention.

Reference is now made to FIG. 20, which depicts a 1024 QAM, hexagonal-cell based constellation optimized under thermal noise and phase noise conditions according to an example embodiment of the invention.

FIG. 20 depicts distribution clusters 2003 of received samples of the optimized constellation, under conditions of SNR=38 dB and phase jitter=0.75 degrees.

Figure 21:
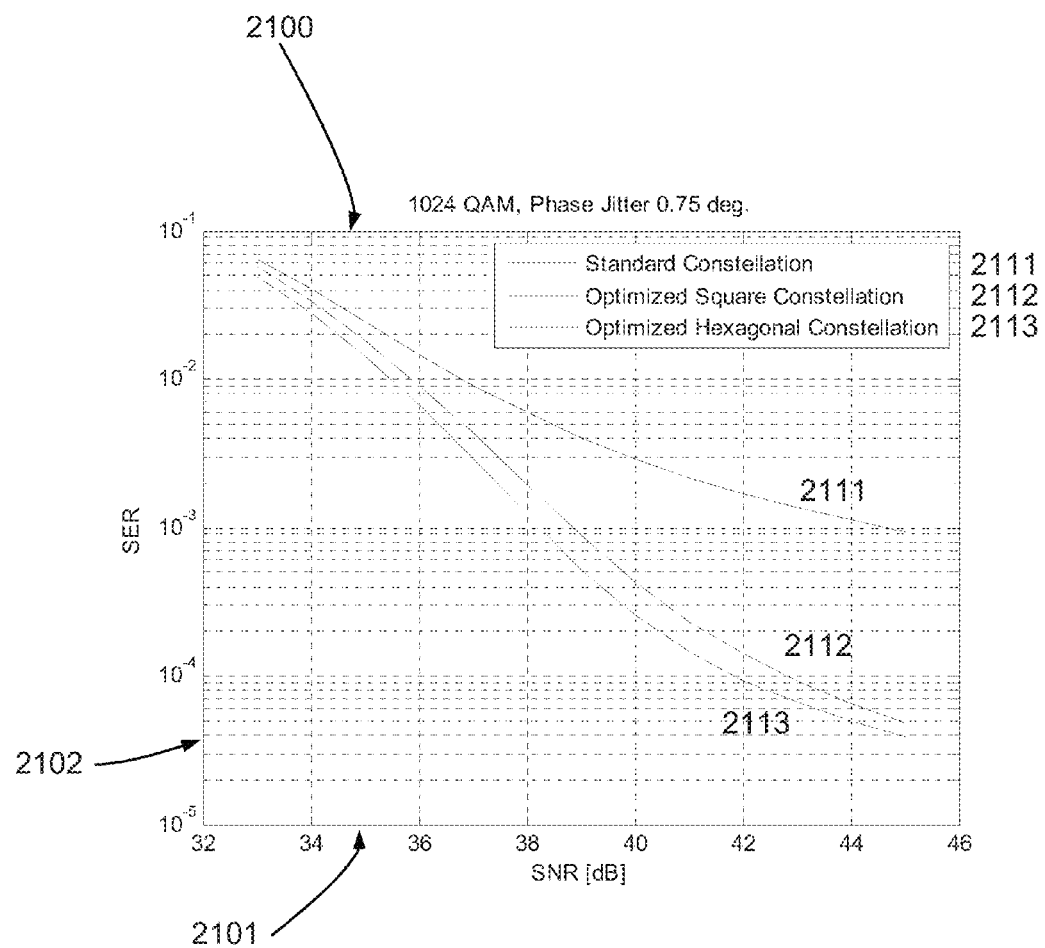
FIG. 21 is a graph illustrating a comparison of error rates of three 1024 QAM constellations operating with the adaptive slicer according to an example embodiment of the invention.

Reference is now made to FIG. 21, which is a graph 2100 illustrating a comparison of error rates of three 1024 QAM constellations operating with the adaptive slicer according to an example embodiment of the invention.

FIG. 21 depicts a graph 2100 with three lines 2111 2112 2113 illustrating symbol error rates as a function of Signal to Noise Ratio under three conditions: a first line 2111 using a standard constellation and an adaptive slicer operating according to an example embodiment of the invention; a second line 2112 using an optimized square-cell based constellation and an adaptive slicer operating according to an example embodiment of the invention; and a third line 2113 using an optimized hexagonal-cell based constellation and an adaptive slicer operating according to an example embodiment of the invention.

The graph 2100 of FIG. 21 has an x-axis 2101 depicting simulated channel Signal to Noise Ratio in units of dB, and a y-axis 2102 depicting Symbol Error Rate.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for a QAM receiver to decide a value of a received symbol of an N-point QAM constellation transmission comprising:
    extracting coordinate values for the received symbol; and
    using a decision method for deciding the value of the received symbol based on the extracted coordinate values,
    in which the decision method for the N-point QAM constellation is updated based, at least in part, on a clustering of received symbols, and
    in which the decision method is implemented using an array, coordinates of a received symbol are converted to an address in the array, and contents of the array at the address provide the value of the received symbol.

2. The method of claim 1 in which the decision method is based on a likelihood value calculated for a received symbol to belong to a specific cluster.

3. The method of claim 1 in which the decision method is calculated based on a Log-Likelihood value calculated for a received symbol to belong to a specific cluster.

4. The method of claim 3 and further comprising using the Log-Likelihood values calculated for a received symbol to calculate a Log-Likelihood-Ratio (LLR) for a bit in said received symbol.

5. The method of claim 1 which the decision method is calculated adaptively in real time.

6. The method of claim 1 which the decision method is calculated based on noise parameters estimated by the receiver.

7. The method of claim 1 in which the coordinates are polar coordinates.

8. The method of claim 1 in which the decision method is calculated based on constellation coordinates provided from a transmitter.

9. The method of claim 1 in which the decision method comprises a selected one of a plurality of preset decision methods.

10. The method of claim 1 and further comprising contents of the array at the address providing a bit LLR (Log-Likelihood Ratio) value of the received symbol.

11. The method of claim 1 in which the number of cells in the array is larger than the number of symbols in the N-point QAM constellation.

12. The method of claim 1 and further comprising the receiver sending a transmitter information about the decision method.

13. The method of claim 12 in which the information comprises information about a noise distribution in received symbols.

14. The method of claim 12 in which the information comprises a mean value of a distribution of samples of at least one of the received symbols.

15. The method of claim 12 in which the information comprises a covariance matrix of a distribution of samples of at least one of the received symbols.

16. The method of claim 12 in which the information is an indication of which preset decision method selected from a plurality of preset decision methods the receiver is using.

17. A method for a QAM receiver to decide a value of a received symbol of an N-point QAM constellation transmission comprising:
    extracting coordinate values for the received symbol; and
    using a decision method for deciding the value of the received symbol based on the extracted coordinate values,
    in which the decision method for the N-point QAM constellation is updated based, at least in part, on a clustering of received symbols; and
    in which the coordinates are Cartesian I and Q coordinates and the receiver updates parameters describing a Gaussian distribution of a received symbol as follows:

$$\underline{\mu}_i = (1-\alpha) \cdot \underline{\mu}_i + \alpha \cdot \underline{x}$$

$$C_i = (1-\alpha) \cdot C_i + \alpha \cdot \begin{pmatrix} (I-\mu_{I,i})^2 & (I-\mu_{I,i})(Q-\mu_{Q,i}) \\ (I-\mu_{I,i})(Q-\mu_{Q,i}) & (Q-\mu_{Q,i})^2 \end{pmatrix}$$

where $\underline{x}$ is a vector representing I and Q coordinates of the received symbol, $\underline{\mu}i$ is a vector representing a mean of a cluster i, $\alpha$ is a parameter for determining a rate of updating, $C_i$ is a covariance matrix of the cluster, and I and Q are values of the I and Q coordinates of the received symbol.

18. A dynamically adaptive slicer for a QAM receiver to decide a value of a received input of an N-point QAM constellation transmission comprising:
    a unit for a constellation subset selection, configured for receiving an input sample and producing a subset of symbols of the N-point QAM constellation;
    a unit for calculating a likelihood that the received input sample belongs to each one of the subset based on cluster parameters read from a cluster parameter unit and producing likelihood values for each one of the subset; and
    a maximum likelihood selection unit for selecting a symbol having a maximal likelihood value from the likelihood values of each one of the subset.

19. The dynamically adaptive slicer of claim 18 and further comprising a cluster parameter update unit for receiving the selected symbol, reading cluster parameters from the cluster parameter unit, producing updated cluster parameters, and writing the updated cluster parameters to the cluster parameter unit.

20. A QAM communication system comprising:
    a QAM receiver comprising a dynamically adaptive slicer according to claim 18 and a QAM transmitter.

21. A method for a QAM transmitter to modify an N-point QAM constellation comprising:
    starting with an initial N-point QAM constellation;
    measuring a clustering of coordinates of the N-point QAM constellation;
    shifting coordinates of at least one symbol of the N-point QAM constellation; and
    producing a modified constellation with shifted coordinates, wherein
    the shifting is based, at least in part, on data describing a clustering of at least some symbols of the N-point QAM constellation, and
    the shifting comprises selecting one preset shifted N-point QAM constellation selected from a plurality of shifted N-point QAM constellation.

22. The method of claim 21 in which the data describing a clustering of at least some symbols of the N-point QAM constellation is received, at least in part, from a receiver sending data describing a clustering of at least some received symbols.

23. The method of claim 21 in which the shifting is based, at least in part, on measuring noise and identifying a known distribution of noise.

24. The method of claim 21 in which the shifting is calculated adaptively in real time.

25. The method of claim 21 in which the coordinate values comprise polar coordinate values.

26. The method of claim 21 in which the initial N-point QAM constellation comprises coordinate values arranged in hexagonal cells.

27. The method of claim 21 in which the initial N-point QAM constellation comprises coordinate values arranged in circles.

28. The method of claim 21 and further comprising the transmitter sending a receiver information about the modified constellation.

29. The method of claim 28 in which the information comprises coordinates for at least one shifted symbol in the modified constellation.

30. The method of claim 28 in which the information is an indication of which preset shifted N-point QAM constellation selected from a plurality of shifted N-point QAM constellations the transmitter is using.

31. A dynamically adaptive constellation mapper for producing coordinate values of a symbol of an N-point QAM constellation comprising:
    an adaptive symbol mapper for receiving an input symbol and producing symbol coordinates for QAM transmission based on a constellation symbol mapping;
    a shift calculator for:
        reading symbol cluster information;
        reading the constellation symbol mapping;
        calculating a shift for coordinates of at least one symbol of the constellation symbol mapping; and
        updating the constellation symbol mapping in the adaptive symbol mapper.

32. The dynamically adaptive constellation mapper of claim 31 and further comprising a unit for receiving the symbol cluster information from a QAM receiver.

33. The dynamically adaptive constellation mapper of claim 31 in which the symbol mapper comprises an array comprising symbol coordinates for each one of the constellation symbols.

34. The QAM communication system of claim 20 in which the QAM transmitter comprises a dynamically adaptive constellation mapper according to claim 33.

35. A method for a QAM transmitter to modify an N-point QAM constellation comprising:
- starting with an initial N-point QAM constellation;
- measuring a clustering of coordinates of the N-point QAM constellation;
- shifting coordinates of at least one symbol of the N-point QAM constellation; and
- producing a modified constellation with shifted coordinates, wherein
- the shifting is based, at least in part, on data describing a clustering of at least some symbols of the N-point QAM constellation; and
- the transmitter sends a receiver information about the modified constellation, in which the information is an indication of which preset shifted N-point QAM constellation selected from a plurality of shifted N-point QAM constellations the transmitter is using.

* * * * *